United States Patent [19]

Nakamura et al.

[11] Patent Number: 5,832,308
[45] Date of Patent: Nov. 3, 1998

[54] APPARATUS FOR CONTROLLING DATA TRANSFER BETWEEN EXTERNAL INTERFACES THROUGH BUFFER MEMORY USING A FIFO, AN EMPTY SIGNAL, AND A FULL SIGNAL

[75] Inventors: Yoshihiro Nakamura; Takao Ogawa, both of Suwa, Japan

[73] Assignee: Seiko Epson Corporation, Tokyo, Japan

[21] Appl. No.: 807,951

[22] Filed: Feb. 28, 1997

Related U.S. Application Data

[62] Division of Ser. No. 285,051, Aug. 2, 1994, Pat. No. 5,644,787.

[30] Foreign Application Priority Data

Aug. 3, 1993 [JP] Japan .................................. 5-192545

[51] Int. Cl.⁶ .................................................. G06F 13/00
[52] U.S. Cl. .......................... 395/873; 395/877; 395/872
[58] Field of Search .................................... 395/877, 842, 395/280, 843, 845, 872, 873; 711/4

[56] References Cited

U.S. PATENT DOCUMENTS

| | | | |
|---|---|---|---|
| 4,410,941 | 10/1983 | Barrow et al. | 711/207 |
| 4,458,316 | 7/1984 | Fry et al. | 395/872 |
| 4,628,451 | 12/1986 | Sawada et al. | 711/206 |
| 5,056,010 | 10/1991 | Huang | 711/4 |
| 5,307,471 | 4/1994 | Ishikawa | 395/280 |
| 5,376,752 | 12/1994 | Limberis et al. | 84/622 |
| 5,398,324 | 3/1995 | Matida et al. | 395/842 |
| 5,406,425 | 4/1995 | Johnston et al. | 360/48 |
| 5,438,665 | 8/1995 | Taniai et al. | 395/845 |
| 5,440,739 | 8/1995 | Beck et al. | 395/200.51 |
| 5,450,546 | 9/1995 | Krakirian | 395/877 |
| 5,469,548 | 11/1995 | Callison et al. | 711/114 |
| 5,507,005 | 4/1996 | Kojima et al. | 395/872 |
| 5,551,054 | 8/1996 | Packer | 395/843 |
| 5,630,172 | 5/1997 | Ami et al. | 395/845 |

FOREIGN PATENT DOCUMENTS

A-55-97630  7/1980  Japan .
A-56-60933  5/1981  Japan .

*Primary Examiner*—Le Hien Luu
*Attorney, Agent, or Firm*—Oliff & Berridge, PLC

[57] ABSTRACT

The present invention provides a data transfer device that transfers data via a buffer memory between first and second external interfaces. A FIFO is interposed between the first external interface and the buffer memory. An empty signal is true when the FIFO is empty an empty signal is true and a full signal is true when the FIFO is full. The data transfer device transfers data from the buffer memory to the FIFO when the full signal is false and decrementing a transfer count of data to be transferred. An end signal is set to true when the transfer count reaches zero. An interface device transfers data from the FIFO to the first external interface when the empty signal is false. The data transfer from the FIFO to said first external interface ends when both the end signal and the empty signal area true.

6 Claims, 27 Drawing Sheets

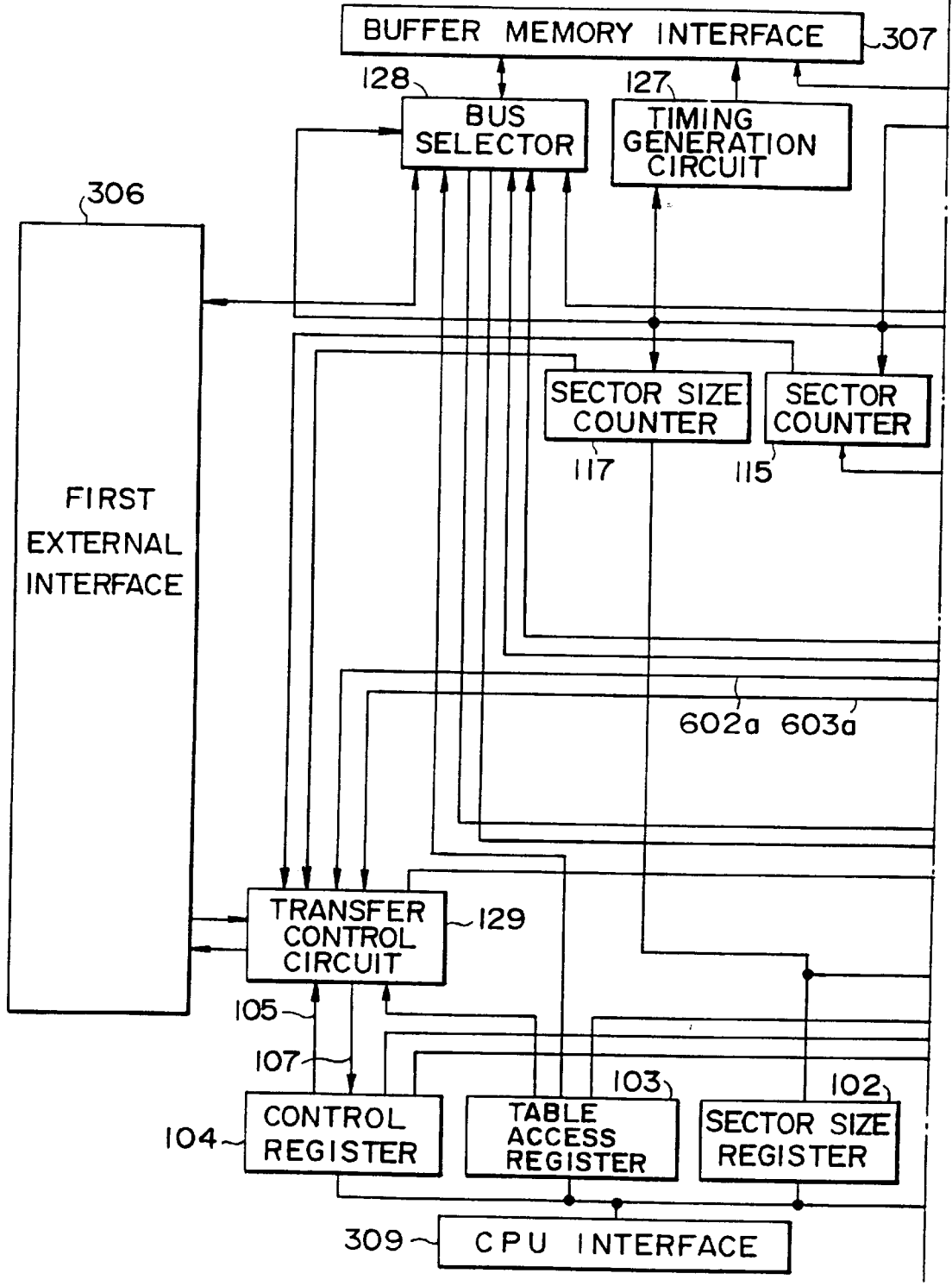

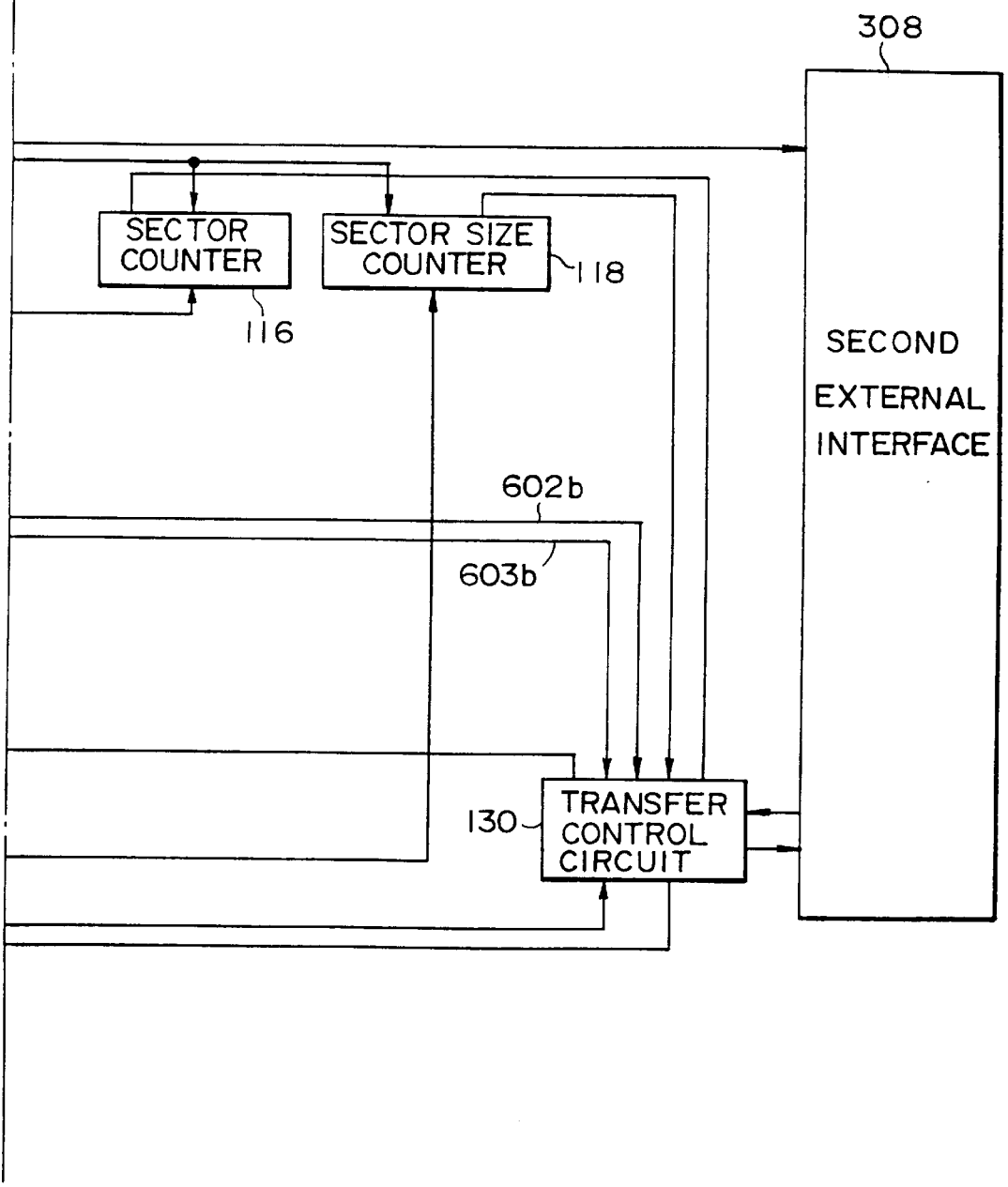

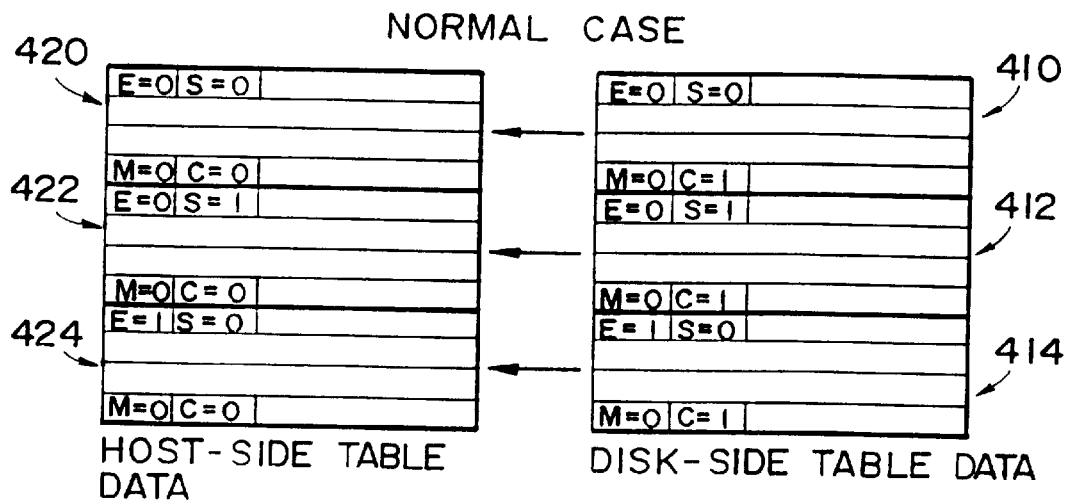
FIG. 7A NORMAL CASE
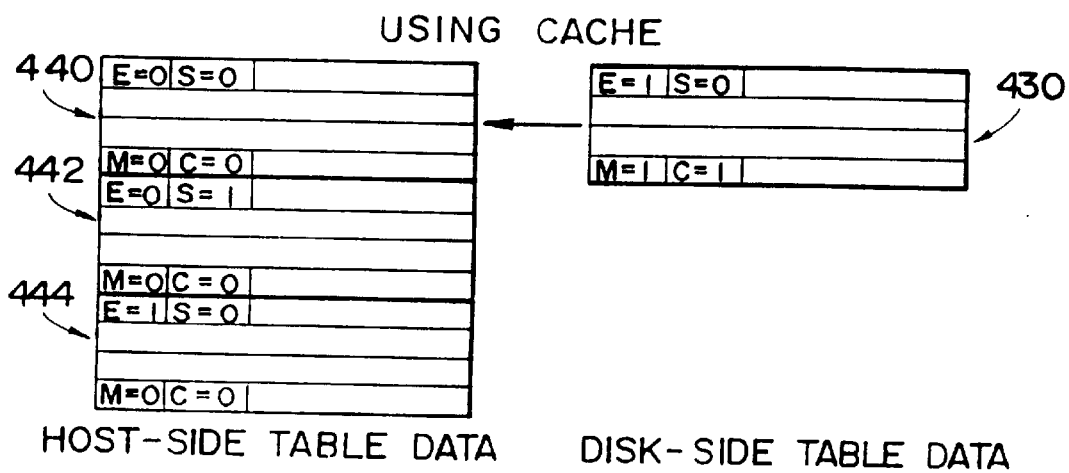
FIG. 7B USING CACHE
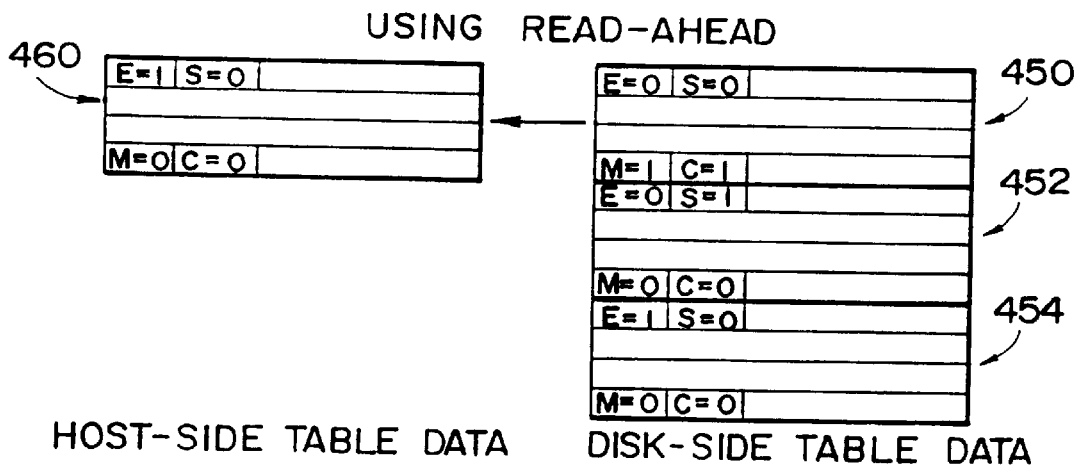
FIG. 7C USING READ-AHEAD

ASYNCHRONOUS INITIATOR DATA OUT PHASE

ASYNCHRONOUS INITIATOR DATA IN PHASE

SYNCHRONOUS INITIATOR DATA IN PHASE

DMA TRANSFER CONTROL

SCSI HANDSHAKE CONTROL

FIG. 25A PRIOR ART
DMC-1

| 502 | 501 | | |
|---|---|---|---|
| D | H | START ADDRESS, UPPER | 503 |
| START ADDRESS, MIDDLE UPPER ||| 504 |
| START ADDRESS, MIDDLE LOWER ||| 505 |
| START ADDRESS, LOWER ||| 506 |

FIG. 25B PRIOR ART
DMC-2 (HOST SIDE)

| | START ADDRESS, UPPER | 513 |
|---|---|---|
| START ADDRESS, MIDDLE || 514 |
| START ADDRESS, UPPER || 515 |
| | NUMBER OF TRANSFER BYTE, UPPER | 516 |
| NUMBER OF TRANSFER BYTE, MIDDLE || 517 |
| NUMBER OF TRANSFER BYTE, LOWER || 518 |

FIG. 25C PRIOR ART
DMC-2 (DISK SIDE)

| NUMBER OF TRANSFER SECTOR | | 508 |
|---|---|---|
| TRACK NUMBER, UPPER || |
| TRACK NUMBER, LOWER || |
| SECTOR NUMBER || |
| | START ADDRESS, UPPER | 510 |
| START ADDRESS, MIDDLE || 511 |
| 512 — START ADDRESS, LOWER | | |

APPARATUS FOR CONTROLLING DATA TRANSFER BETWEEN EXTERNAL INTERFACES THROUGH BUFFER MEMORY USING A FIFO, AN EMPTY SIGNAL, AND A FULL SIGNAL

This is a division of application Ser. No. 08/285,051 filed Aug. 2, 1994 now U.S. Pat. No. 5,644,787.

BACKGROUND OF THE INVENTION

1. Technical Field

The present invention relates to a data transfer control device capable of transferring data in block units, and an information processing system that incorporates such a data transfer control device.

2. Background Art

A direct memory access (DMA) method is often used as means of transferring data at high speeds. With this DMA method, the generation of timing signals necessary for data transfer is performed by a hardware device called a DMA controller. During data transfer, the transfer is controlled by the DMA controller, obviating the need for control by a program from an external controller (such as a CPU), and, at the end of transfer, the relevant status is posted to the external controller. Prior art examples of such a DMA controller are disclosed in Japanese Patent Application Nos. 55-97630 and 56-60933.

When the external controller sends a data transfer command to a DMA controller of this type, it specifies management information (hereinafter, this management information is called table data) that comprises a transfer start address and a transfer count for each of the transfer source and transfer destination. The area specified in this manner is transferred in sequence as one group of data blocks. Note that a transfer end address could be used in this case instead of the transfer count, and also that the start address can be unnecessary if the transfer source or the transfer destination is simply an input port or output port.

With a DMA controller for disk memory such as a hard disk or magneto-optical disk, a read-ahead method and the Least Recently Used (LRU) method are often used. With this read-ahead method, when a command arrives from the controller to read an nth sector on the disk, the (n+1st)th and (n+2nd)th sectors are read ahead and the read-ahead data is stored in a buffer memory. With the DMA controller for a disk memory, reading data from the disk memory takes the most time. That is why if a plurality of sectors of data could be read with a single disk read command, the overall data transfer speed can be increased. The LRU method rearranges the excessive data that has been read out by this read-ahead method, and deletes data that is not accessed for a while from the data stored in the buffer memory. Thus, if excessive data is read by the read-ahead method and older data is deleted sequentially by the LRU method, as shown in FIG. 24, the data blocks are not arranged in sequence physically.

However, with a DMA controller using this conventional method, one group of data blocks can be specified for each transfer start command. This means that, to sequentially transfer groups of data blocks 400, 402, and 404 that are not arranged in sequence physically, as shown in FIG. 24, it is necessary to wait for the transfer of one group of data blocks to end before specifying the next data block, and then restart the data transfer. This creates a problem in that the program overhead for transfer control executed by the external controller is extremely large.

An LSI (hereinafter abbreviated to DMC-1) that solves the above-described problem with this type of DMA controller used as a disk memory controller has been developed. With this DMC-1, groups of data blocks can be specified for a single transfer start command, a management area for specifying data blocks is reserved in the buffer memory managed by the DMC-1, and start addresses 503 to 506 of each data block can be stored, as shown in FIG. 25A. This makes it possible to modify the transfer of data blocks that are not arranged physically in sequence, a transfer arranged logically in sequence. Table data for block specification with the DMC-1 also includes a host enable bit (H bit) 501 and a disk enable bit (D bit) 502. Thus if, for example, H=1 and D=0 ) where 1 indicates true and 0 indicates false), those data blocks are transferred between the host (this is assumed to be mainly a SCSI interface) and the buffer memory. If H=0 and D=1, those data blocks are transferred between the disk and the buffer memory. This enables data transfer on both the host and disk sides with a single group of table data, facilitating the implementation of the read-ahead methods such as a cache method that is often used with disk memory.

However, with the DMC-1, the data block specification for one group can be done only per sector, which leads to a problem in that the size of the management area becomes extremely large. In other words, if, for example, 100 sectors are to be transferred, the table data shown in FIG. 25A is required for all of the 100 sectors, and thus an area capable of storing 100 sets of table data must be provided in the buffer memory. Another practical problem is raised when the upper limit of the area size is exceeded. In such case, the transfer must be carried out several times, making the control very difficult. Further, once the external controller issues a transfer start command, it is not possible to make the next data block specification until the transfer ends, raising the problem that the program overhead of the external controller becomes large if there is a large number of data blocks.

Subsequently, an LSI (hereinafter abbreviated to DMC-2) that improved upon the above-described problems with the DMC-1 was developed. With this DMC-2, concerning a disk-side transfer it is possible to specify a number of transfer sectors 508 in addition to the start addresses 510 to 512, as shown in FIG. 25C. Therefore, the DMC-2 differs from the above-described DMC-1 in that it is not necessary to specify the start addresses for all the sectors to be transferred, and physically continuous sectors can be summarized and specified as one data block. This point means that the program overhead of the external controller in the DMC-2 can be reduced in contrast with that of the DMC-1. In addition, the management area for specifying data blocks is reserved within the LSI with the DMC-2, unlike with the DMC-1, and this management area operates as a queue buffer. Therefore, if a previously specified area should become empty during a transfer operation, the next data block specification can be added, leading to a further decrease in the program overhead of the external controller. Further, a queue buffer is introduced in the DMC-2, even for data block specification on the host side, so that a block specification can be added during transfer.

However, with the above-described DMC-2, the block specification on the host side requires the start addresses 513 to 515 and a number of transfer byte 516 to 518, as shown in FIG. 25B. In other words, data is transferred between the host and the buffer memory in byte units, and between the buffer memory and the disk in sector units. Therefore, when data is to be transferred between the host and the disk, the problem arises in that a number of transfer sectors must be converted into a number of transfer bytes, or vice versa. Further, from practical considerations of system operation, it is far more common to use a transfer unit that is a groups of sectors, such as a cluster or segment, rather than individual sectors. Therefore, if these transfers are specified in sector units, the specification information becomes redundant, and thus increases the program overhead of the external controller.

In this case, the data block specification information could be made common in the same way as in the previously described DMC-1, enabling the specification of a plurality of data blocks. Nevertheless, making the information common raises further problems which will be discussed below. For example, considering the case where the disk-side and host-side table data is made common and data is to be transferred from the disk side to the host side via the buffer memory. In this case, table data for data transfer between the disk and the buffer memory is stored in the management area of the DMC-2, and this table data is also used for the data transfer between the buffer memory and the host. However, since disk memory read and write operations usually take time, the data transfer on the disk side is slower than that on the host side. Further, since the management area that stores the table data in the DMC-2 has, for example, a two-stage queue buffer configuration, when two sets of table data from transfer between the disk and the buffer memory are stored in this queue buffer, and it is not possible to add new data to the table data for transfer between the buffer memory and the host. This raises the problem that data transfer between the buffer memory and the host has to wait until data transfer between the disk and the buffer memory has ended.

One solution to this problem that has been considered is not to keep the table data in common, as it is with the DMC-2, but to physically divide it. This does solve the above-described problem, but raises a different problem in that even if this table data is kept in common, the external controller has to specify table data for both sides, which is time-consuming.

Another problem concerns how to end the transfer operation as described below. In the DMC-2 the transfer ends when the queue buffer becomes empty. Therefore, if, for example, it is considered that the transfer speed on the host side is faster than that on the disk side on reading data from disk, it is highly possible that the management area on the host side becomes empty quicker, and therefore the transfer operation ends on the host side as soon as the management area becomes empty. This means that another transfer start command must be issued to transfer the remaining data blocks on the host side, thus raising the problem of increasing the program overhead of the external controller.

A final problem concerns the connections of the external interfaces. An external interface is typically a SCSI interface, but conventionally the above-described DMC-1 or DMC-2 and SCSI controller LSI are combined into a single system. Recent progress in integration has led to marketing such product which is the combination of the above-described two types of LSI on a single chip. However, the basic internal structure of such product is equivalent to two chips that are simply connected together. Thus, since each of the SCSI controller side and the DMC-1 (or DMC-2) side has an independent transfer count counter, the transfer count has to be set in two places. This causes bugs during program development. Further, if the circuitry is modified in an attempt to increase the magnitude of the transfer count, the number of stages of both counters must be increased. This leads increases the circuitry size, and thus reduces reliability.

SUMMARY OF THE INVENTION

The present invention was devised in light of the above-described problems, and has as an object to provide a data transfer control device that reduces the load on the external controller by improving the method of specifying data blocks, and thus provides more efficient data transfer. The invention also relates to an information processing system that incorporates this data transfer control devise.

A further object of this invention is to provide a data transfer control device that can use a single transfer count counter to control the data transfer via a buffer memory between a plurality of interfaces, and an information processing system that incorporates this data transfer control device.

In order to achieve the above objects, a first aspect of this invention concerns a data transfer control device for controlling data transfer via a buffer memory between first and second external interfaces of a plurality of external interfaces, on the basis of at least one group of table data set by the external control means, wherein:

the table data comprises a transfer start address, a transfer count, and a transfer count unit selection parameter for selecting a unit for the transfer count; and the data transfer control device further comprises transfer count counting means for obtaining the transfer count of data to be transferred between the buffer memory and at least one of the first and second external interfaces; transfer count setting means for selecting a unit for the transfer count from the transfer count unit selection parameter that is included in the table data, converting the transfer count that is included in the table data on the basis of the thus-selected unit, and setting the thus-converted transfer count in the transfer count counting means; and means for starting data transfer, on the basis of a transfer start command from the external control means, and transferring data between the buffer memory and at least one of the first and second externals interface within an address range specified on the basis of the transfer start address and a count result obtained by the transfer count counting means.

In accordance with this first aspect of the present invention, the table data comprises a transfer start address, a transfer count, and a transfer count unit selection parameter. This table data is set by an external control means, and in accordance with the present invention the table data can be stored in a buffer memory or in a storage means provided within the data transfer control device. A transfer count counting means is designed to count the data to be transferred between the buffer memory and at least one of the first and second external interfaces, and a transfer count setting means is designed to set the transfer count obtained by transfer count counting means. The transfer count setting means also selects the unit for the transfer count, for example, between sector units and segment units by the transfer count unit selection parameter in the table data. The transfer count included in the table data is converted on the basis of the selected unit, and the converted transfer count is set in the transfer count counting means. The data transfer means starts the data transfer when a transfer start command is issued from the external controller. The address range of the data to be transferred in this case is determined on the basis of the transfer start address in the table data and the count result obtained by the transfer count counting means. In accordance with the present invention as described above, the unit of the transfer count can be selected freely by the transfer count unit selection parameter. This enables a data block specification with a relatively small amount of information in the table data, concerning data blocks with buffer memory addresses that are physically in sequence, and reduces the CPU processing overhead. This invention is particularly effective for data transfer by a cache method. In this case, the transfer count unit of the first and last blocks of a series of data blocks is specified as sector units, but that for the remaining blocks in the center is specified as segment units. This enables a huge reduction in the quantity of information in the table data, in contrast with the prior art, thus enabling more efficient data transfer.

According to a second aspect of this invention, the transfer count setting means comprises a multiplier storage means for storing a multiplier for converting the unit for the transfer count that is included in the table data, multiplier means for outputting a result obtained by multiplying the transfer count that is included in the table data by the multiplier, and means for selecting either the output of the multiplier means or the transfer count that is included in the table data, on the basis of the transfer count unit selection parameter.

In accordance with this second aspect of the present invention, the transfer count setting means comprises a multiplier storage means, a multiplier means, and a selection means. A multiplier for converting the unit of the transfer count that is included in the table data is stored in the multiplier storage means. If, for example, one segment consists of 4 sectors, this 4 is stored as a multiplier. The transfer count that is included in the table data is multiplied by the multiplier in the multiplier means. If, for example, the transfer count is 100, 400 is output as a multiplication result. Either the output of the multiplier means or the transfer count that is included in the table data is selected by the selection means, on the basis of transfer count unit selection parameter. Thus, if, for example, sector unit is selected by the transfer count unit selection parameter, 400 is output; if segment unit is selected, 100 which is the transfer count in the table data is output. The transfer count obtained by the transfer count counting means is set on the basis of this output. As a result, in accordance with the present invention, it is possible to use commonly the transfer count counting means that is the output destination of the selection means, even if the unit of the transfer count is changed, and thus reducing the size of circuitry and simplifying the circuitry control.

A third aspect of this invention concerns a data transfer control device for controlling data transfer via a buffer memory between first and second external interfaces of a plurality of external interfaces, on the basis of at least one group of table data set by an external control means, wherein:

the table data comprises a transfer end parameter for indicating that the table data is of the last group in a series of table data, and means for temporarily halting the next transfer operation, when the transfer end parameter is true during data transfer between the buffer memory and at least one of the first and second external interfaces.

In accordance with this third aspect of the present invention, the table data includes a transfer end parameter. During data transfer, when the transfer end parameter that is included in the table data used for performing this data transfer is found to be true, the next transfer operation is halted. Thus, accordingly control of the data transfer end can be achieved, simply by including a transfer end parameter in the table data. This invention also enables the following advantages over the prior art method in that data transfer ends when the transfer block specification area becomes empty. In other words, in the prior art example, the external interface with the faster transfer speed creates a problem in which transfer start commands are issued repeatedly. In contrast, the present invention can prevent such problem and maintain a uniform control that does not depend on transfer speed.

According to a fourth aspect of this invention, table data for data transfer between the first external interface and the buffer memory is set separately from table data for data transfer between the second external interface and the buffer memory.

In accordance with this fourth aspect of the present invention, table data for the first external interface is set separately from table data for the second external interface. This makes it possible to control the transfer operations on the first external interface side and the second external interface side independently. For example, if a transfer count unit selection parameter has been included in the table data, the first external interface and the second external interface can have different transfer count units. Similarly, if a transfer end parameter has been included in the table data, the first external interface and the second external interface can have different transfer end operations. Thus, the present invention can set different transfer count units, and control the data transfer end independently on the first external interface side and the second external interface side, thus enabling more intelligent data transfer control.

A fifth aspect of this invention concerns a data transfer control device for controlling data transfer via a buffer memory between first and second external interfaces of a plurality of external interfaces, on the basis of at least one group of table data set by an external control means, wherein:

the table data comprises a copy specification parameter for specifying that table data for one of the first or second external interface is to be copied to generate table data for the other one, and the data transfer control device comprises means for performing data transfer between the buffer memory and the other one when the copy specification parameter is true, on the basis of the table data for the other one that is generated by copying table data for one of the first or second external interface.

In accordance with this fifth aspect of the present invention, the table data includes a copy specification parameter. By setting this copy specification parameter true, table data for one of the first or second external interface can be copied to generate table data for the other one. Data transfer between the buffer memory and the other one is performed on the basis of the thus-copied table data. Thus, the present invention can make table data common between the first and second external interfaces, by using a copy specification parameter. This common table data is physically separated, and therefore prevents the prior art problem in which the transfer speed of one external interface drops due to its dependence on that of the other one.

According to a sixth aspect of this invention, the table data further comprises a transfer end parameter for indicating that the table is of the last group in a series of table data, and a control parameter for obtaining a transfer end parameter of table data for the other one that is a copy destination, on the basis of a transfer end parameter of table data for one of the first or second external interface that is a copy source; and the data transfer control device further comprises means for setting the transfer end parameter of table data of the copy destination false, when both the transfer end parameter and the control parameter of table data of the copy source are false, and setting the transfer end parameter of table data of the copy destination true, when the transfer end parameter of table data of the copy source is true, and the control parameter thereof is false.

In accordance with this sixth aspect of the present invention, the table data includes a transfer end parameter and control parameter in addition to the copy specification parameter. When both the transfer end parameter and the control parameter of the table data of the copy source are false, the transfer end parameter of the copy destination is set false; when the transfer end parameter of the copy source is true but the control parameter is false, the transfer end parameter of the copy destination is set true. Thus, the data can be transferred from one external interface to the buffer memory and this data is transferred to the other external interface without any changes, by simply setting the table data of the copy source. In other words, in this case, first the transfer end parameter and control parameter of the table data of the copy source are both set false. Despite this setting, since the transfer end parameter of the copy destination is false, the transfer operation at the copy destination cannot end. Therefore, this enables the data transferred from one external interface to the buffer memory to be output to the other external interface without any changes. When data transfer ends, the transfer end parameter in the table data of the copy source becomes true and the control parameter becomes false. This ends the data transfer for one external interface side, and can also end that for the other external interface since the transfer end parameter of the copy destination also becomes true in this case.

According to a seventh aspect of this invention, the data transfer control device further comprises means for setting the transfer end parameter of table data of the copy destination false, when both the transfer end parameter and the control parameter of table data of the copy source are true.

In accordance with this aspect of the present invention, when the transfer end parameter and the control parameter of the copy source are both true, the transfer end parameter of the copy destination is set false. This enables data to be read out by the cache method. In other words, in this case, the transfer end parameter and the control parameter of the table data of the copy source are both set true. This causes the data transfer for one external interface to end. In contrast, since the transfer end parameter of the table data for the copy destination is false, the data transfer for the other external interface does not end. Therefore, the other external interface can read sequentially the other data blocks that are hit, thus enabling data to be read by the cache method.

According to an eighth aspect of this invention, the data transfer control device comprises means for setting the transfer end parameter of table data of the copy destination true, when the transfer end parameter of table data of the copy source is false and the control parameter thereof is true.

In accordance with this eighth aspect of the present invention, when the transfer end parameter of the copy source is false and the control parameter thereof is true, the transfer end parameter of the copy destination is set true. This enables data to be read by the read-ahead method. In other words, in this case, the transfer end parameter of the table data for the copy source is set false and the control parameter thereof is set true. This enables data transfer to continue without ending the data transfer on one external interface sided. In contrast, since the transfer end parameter of the table data for the copy destination becomes true, data transfer ends on the other external interface side. Therefore, data with neighboring addresses can be read in sequence on one external interface side, and thus enabling data to be read by the read-ahead method.

A ninth aspect of this invention concerns a data transfer control device for controlling data transfer via a buffer memory between first and second external interfaces of a plurality of external interfaces, wherein:

the data transfer control device comprises interface control means for controlling the first external interface which is an interface that transfers data by using an acknowledge signal and a request signal; First In, First Out (FIFO) storage means interposed between the first external interface and the buffer memory for temporarily storing transfer data; FIFO control means having at least means for setting an empty signal true, when the empty capacity of the FIFO storage means is equal to the storage capacity of the FIFO storage means, and setting a full signal true when the FIFO storage means has no empty space; and data transfer control means for providing control for data transfer between the FIFO storage means and the second external interface, via the buffer memory;

the data transfer control means comprises means for transferring data from the buffer memory to the FIFO storage means, when the full signal is false; transfer count counting means for obtaining the transfer count of data transferred from the buffer memory to the FIFO storage means; and means for setting an end signal true when the transfer count reaches zero; and the interface control means comprises means for transferring data from the FIFO storage means to the first external interface when the empty signal is false, and means for ending the data transfer from the FIFO storage means to the first external interface, when both the end signal and the empty signal are true.

In accordance with this aspect of the present invention, data is transferred from the buffer memory to the FIFO storage means when the full signal is false. This prevents the state occurring in which data is input to the FIFO storage means even though the status of the FIFO storage means is full. When the transfer count obtained by the transfer count counting means reaches zero, the end signal becomes true and the fact that the transfer count has become zero is posted to the interface control means. On the interface control means side, data is transferred from the FIFO storage means to the first external interface when the empty signal is false. This prevents the state occurring in which data is output from the FIFO storage means even although the status of the FIFO storage means is empty. When both the end signal and the empty signal are true, data transfer ends. In other words, since in this case it is possible to determine that data does not exist in the buffer memory and the FIFO storage means, normal end of data transfer can be guaranteed. Further, in accordance with the present invention, the transfer count counting means can be incorporated commonly in both the data transfer control means and the interface control means. This enables setting the transfer count in a transfer count counting means at a single location feasible, thus reducing bugs during firmware development. If the maximum transfer count is increased, the number of stages in the transfer count counting means in also increased. Nevertheless, a single transfer count counting means at one location described in the present invention can limit the increase in the circuitry size caused by the increased stages. Thus, it is possible to increase the maximum transfer count while keeping the circuitry size smaller, and improves the reliability of the LSI. The present invention also enables data to transfer normally from the second external interface through the buffer memory and the FIFO storage means to the first external interface, when the transfer count counting means is made common.

According to a tenth aspect of this invention, the data transfer control device further comprises offset calculation means for calculating the difference between the number of times the request signal is generated and the number of times the acknowledge signal is generated, as an offset counter value, and means for determining the timing at which the request signal or acknowledge signal is generated, on the basis of the offset counter value.

In accordance with this tenth aspect of the present invention, the difference between the number of times the request signal is generated and the number of times the acknowledge signal is generated is calculated as the offset counter value, and the timing at which the request signal or acknowledge signal is generated is determined by the offset counter value. Consider a case in which the first external interface is a SCSI interface and this data transfer control device is on the initiator side. In this case, an acknowledge signal is output in response to a request signal from the target. During this time, the output of the acknowledge signal can be controlled in such a manner that the number of times the acknowledge signal is generated does not exceed the number of times the request signal is generated, by referring the offset counter value. On the other hand, when this data transfer control device is on the target side, the output of the request signal can be controlled in such a manner that the offset counter value stays less than the maximum value, by referring to the offset counter value. Thus, the present invention enables the request signal and the acknowledge signal to be generated normally, even in synchronous mode. In other words, the present invention can prevent the number of times the acknowledge signal is generated from exceeding the number of times the request signal is generated, and the offset counter value from exceeding the maximum value.

An eleventh aspect of this invention concerns a data transfer control device for controlling data transfer via a buffer memory between first and second external interfaces of a plurality of external interfaces, wherein:

the data transfer control device comprises interface control means for controlling the first external interface which is an interface that transfers data by using an acknowledge signal and a request signal; FIFO storage means interposed between the first external interface and the buffer memory for temporarily storing transfer data; FIFO control means having at least means for setting an empty signal true, when the empty capacity of the FIFO storage means is equal to the storage capacity of the FIFO storage means, and setting a full signal true, when the FIFO storage means has no empty space; and data transfer control means for providing control for data transfer between the FIFO storage means and the second external interface, via the buffer memory;

the data transfer control means comprises means for transferring data from the FIFO storage means to the buffer memory when the empty signal is false; transfer count counting means for obtaining the transfer count of data transferred from the FIFO storage means to the buffer memory; and means for setting an end imminent signal true and also temporarily halting the data transfer when the transfer count becomes equal to the storage capacity of the FIFO storage means, restarting the data transfer at a stage at which the full signal becomes true, and ending the data transfer when the data count to be transferred becomes zero; and the interface control means comprises means for transferring data from the first external interface to the FIFO storage means when the full signal is false; and means for performing data transfer from the first external interface to the FIFO storage means until the full signal becomes true when the end imminent signal is true, and ending the data transfer when the full signal becomes true.

In accordance with this eleventh aspect of the present invention, data is transferred from the FIFO storage means to the buffer memory while the empty signal is false. When the transfer count obtained by the transfer count counting means becomes equal to the storage capacity of the FIFO storage means, the end imminent signal becomes true to indicate to the interface control means that the transfer is about to end, and also the data transfer is temporarily halted. On the other hand, on the interface control means side, data is transferred from the first external interface to the FIFO storage means while the full signal is false. When the end imminent signal becomes true, data is transferred until the full signal becomes true, and the data transfer ends when the full signal becomes true. The data transfer control means restarts the data transfer when the full signal becomes true in this manner, and ends the data transfer, when the number of data items to be transferred becomes zero. This can efficiently prevent inputting excessive data to the FIFO storage means. Further, in accordance with the present invention, the transfer count counting means can be incorporated commonly in the data transfer control means and the interface control means. This reduces bugs during firmware development, and permits increase in the maximum transfer count while keeping the circuitry size small. In accordance with the present invention, data can be transferred normally from the first external interface through the FIFO storage means and the buffer memory to the second external interface, when the transfer count counting means has been made common.

According to a twelfth aspect of this invention, the data transfer control device further comprises offset calculation means for calculating the difference between the number of times the request signal is generated and the number of times the acknowledge signal is generated, as an offset counter value; means for adding the offset counter value to the number of data items in the FIFO storage means; means for comparing the offset counter value and the number of data items in the FIFO storage means; and means for determining the timing at which the request signal or acknowledge signal is generated, on the basis of the offset counter value, an addition result obtained by the adder means, and a comparison result obtained by the comparison means.

In accordance with this twelfth aspect of the present invention, the timing at which the request signal or acknowledge signal is generated is determined by the offset counter value, the addition result obtained by the adder means, and the comparison result obtained by the comparison means. Consider a case in which the first external interface is a SCSI interface, and this data transfer control device is on the initiator side. In this case, the offset counter value is compared with the number of data items in the FIFO storage means, and the data transfer control means side can be synchronized with the interface control means side by controlling the output of the acknowledge signal so that the offset counter value becomes equal to this number of data items. If, on the other hand, this data transfer control device is on the target side, the sum of the offset counter value and the number of data items in the FIFO storage means is obtained, and prevents outputting excessive request signal by controlling the request signal so that this sum does not exceed the storage capacity of the FIFO storage means. Thus, the present invention enables the request and acknowledge signals to be generated normally even in synchronous mode.

An information processing system according to a thirteenth aspect of this invention comprises the above described data transfer control device, external devices connected to the first and second external interfaces, a buffer memory, and an external control means.

This present invention enables an information processing system that is capable of transferring data efficiently between the external devices connected to the first and second external interfaces.

BRIEF DESCRIPTION OF THE DRAWINGS

FIG. 7A, FIG. 7B, and FIG. 7C are diagrams used for illustrating a copy operation using a copy specification parameter and a control parameter;

FIG. 25A, FIG. 25B, and FIG. 25C show examples of table data in a prior art data transfer control device.

PREFERRED EMBODIMENTS OF THE INVENTION

The present invention will be described below, with reference to preferred embodiments thereof.

First Embodiment

Figure 1:
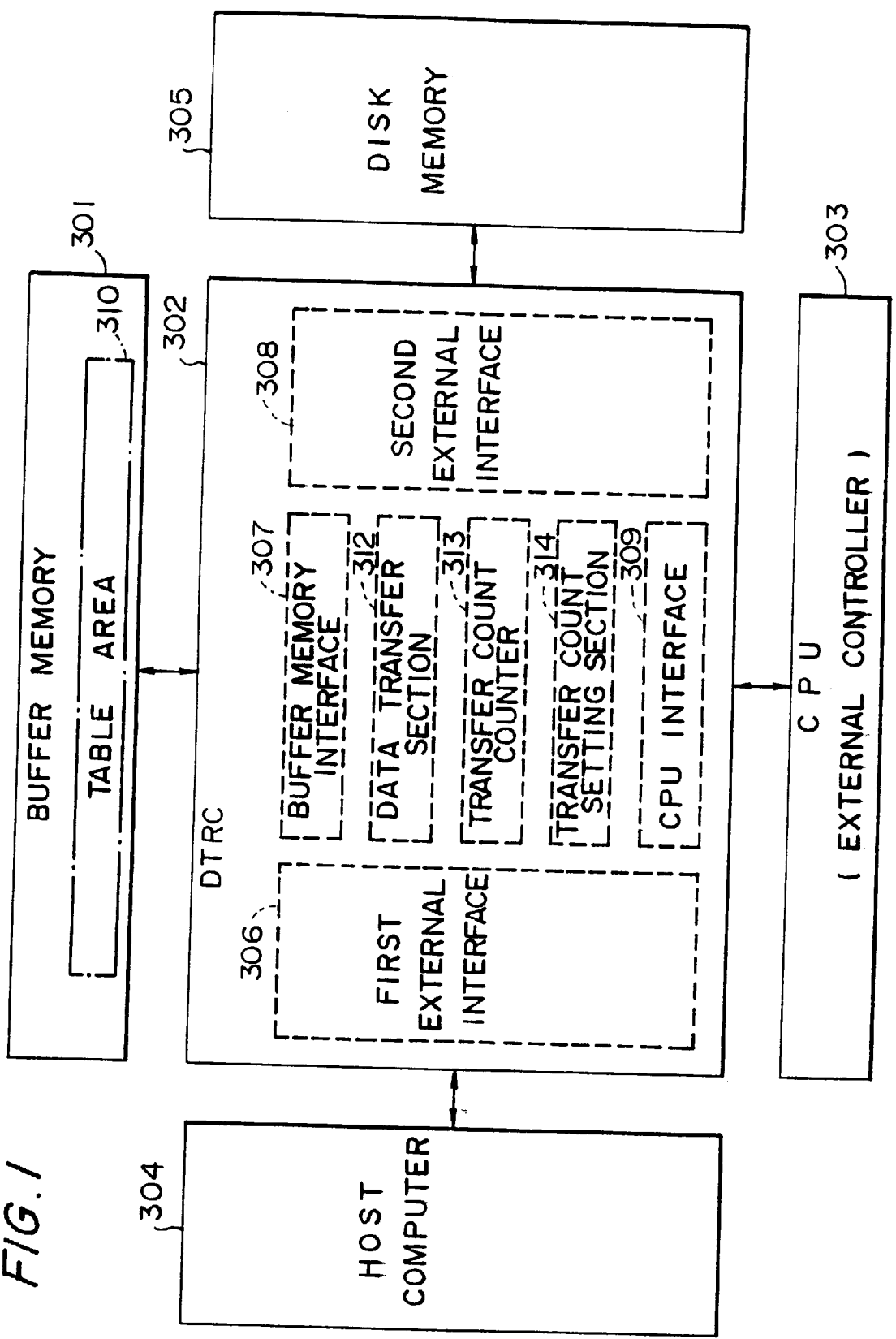
FIG. 1 is a block diagram of a first embodiment of this invention.

A block diagram of an information processing system formed of a data transfer control device (hereinafter abbreviated to DTRC) 302 relating to a first embodiment of this invention, together with peripheral devices thereof, is shown in FIG. 1. The DTRC 302 has four interfaces, namely: a CPU interface 309, a first external interface 306, a second external interface 308, and a buffer memory interface 307. The CPU interface 309 is an interface that connects a CPU (external controller) 303 which controls the DTRC 302 by setting registers within the DTRC. The first and second external interfaces 306 and 308 are interfaces that connect external devices and are used for transferring data between these external devices. More specifically, the description below is based on the assumption that a host computer 304 is the external device connected to the first external interface 306 and a disk memory 305 is the external device connected to the second external interface 308. The buffer memory interface 307 is an interface that connects a buffer memory 301, and data being transferred through the first and second external interfaces 306 and 308 is stored in the buffer memory 301. The buffer memory 301 enables data to be transferred to and from the CPU 303 through the CPU interface 309.

A table area 310 is provided in the buffer memory 301, and at least one group of table data is set in this table area 310 by the CPU 303. This table data comprises a transfer start address, a transfer count, and a transfer count unit selection parameter for selecting the unit for the transfer count. The table data also includes a transfer end parameter used when controlling transfer end, a copy specification parameter used when copying table data, and a control parameter. A transfer count counter 313 is provided in the DTRC 302 to count the number of data transfers between the buffer memory 301 and the first and second external interfaces 304 and 305. A transfer count setting section 314 that is also provide din the DTRC 302 sets the transfer count counted by the transfer count counter 313. This setting is performed as described below. That is, the unit of the transfer count is selected in the transfer count setting section 314 by the transfer count unit selection parameter that is part of the table data. More specifically, the selection can be made between either sector units or segment units, for example. The transfer count within the table data is converted on the basis of this selected unit and the converted transfer count is set in the transfer count counter 313. When a transfer start command is issued from the CPU 303, a data transfer section 312 starts the data transfer. In this case, the address range of the data to be transferred is determined on the basis of the start address in the table data and the count result obtained by the transfer count counter 313.

Note that the DTRC 302 also comprises means for implementing the necessary processing when it is controlling transfer end or copying table data. The table data is stored in the table area 310, as described above, but, during the actual data transfer specified by the table data, a register is provided in the DTRC 302 of this first embodiment, and the appropriate table data from the table area 310 is stored in this register and used for the processing. In order to design a device that processes data transfer efficiently and is more intelligent, it is preferable that table data is set separately for each of the first and second external interfaces, and also that a data transfer section 312, transfer count counter 313, and transfer count setting section 314 are preferably provided for each of the first and second external interfaces.

Figure 2B:
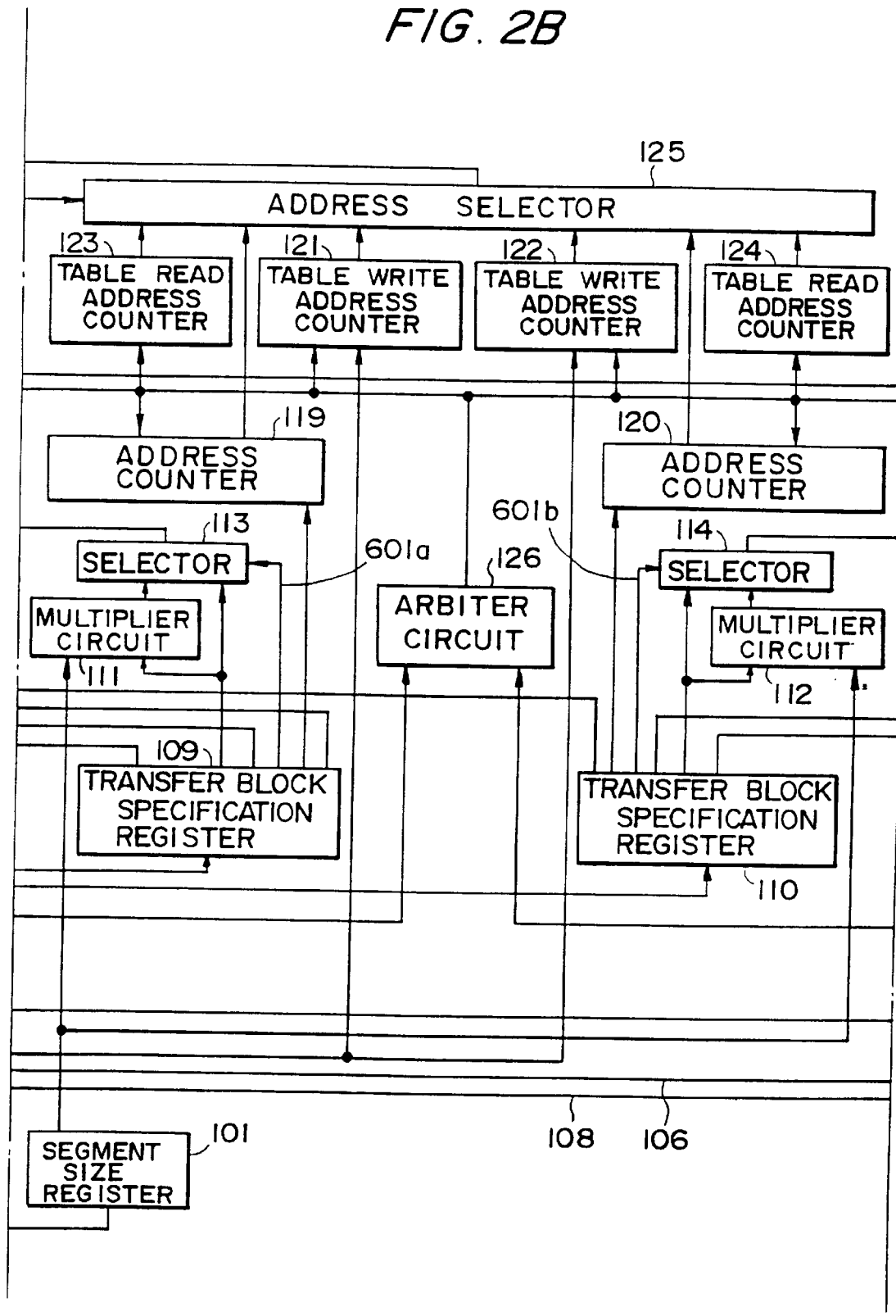
FIG. 2 is a block diagram of an example of the detailed configuration of the first embodiment.

A block diagram of a detailed example of the interior of the DTRC is shown in FIG. 2. In this example, a segment size register 101 is a register that sets the number of sectors in one segment. A sector size register 102 is a register that sets the number of bytes in one sector. A control register 104 is a register for passing transfer start commands 105 and 106 from the CPU to the DTRC at transfer start, and end status signals 107 and 108 from the DTRC to the CPU at transfer end. There are two types of transfer start command: one for the first external interface 306 and the other for the second external interface 308. Transfer block specification registers 109 and 110 are registers for storing table data for one block, including the transfer start address, the transfer count, and other parameters that will be described later, when data transfer is executed.

Figure 3A:
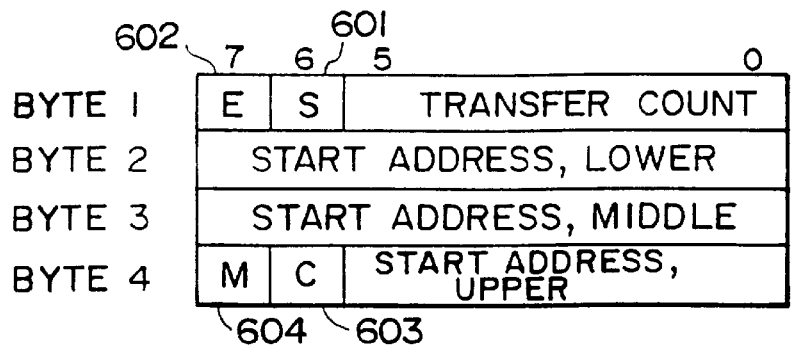
FIG. 3A shows an example of the format of table data.

The table data used in this embodiment is of the format shown in FIG. 3A. The transfer count is set by bit 5 to bit 0 of byte 1. Bit 6 of byte 1 is a transfer count unit selection parameter (hereinafter, this is called the S bit); the count unit is converted in accordance with this value. For example, if the S bit is 1, the transfer count is specified in segment units; if the S bit is 0, the transfer count is specified in sector units. The transfer start address is specified by bytes 2 to 4. In this example, bytes 2, 3, and 4 correspond to the lower, middle, and upper parts to the start address, respectively.

Bit 7 of byte 1 is a transfer end parameter (hereinafter, this is called the E bit); the specification of this bit indicates that the current table data is the last group in a series of transfer operations. Bit 6 of byte 4 is a copy specification parameter (hereinafter, this is called the C bit); the specification of this bit instructs copying table data from one side to the other. Bit 7 of byte 4 is a control parameter (hereinafter, this is called the M bit); the specification of this bit controls the copy operation specified by the above-described C bit in a manner that is described below. A table area is reserved on the host side and the disk side in sequence from the lower address side in the buffer memory, as shown in FIG. 3C. This table data is to be stored in these areas by the CPU.

Multiplier circuits 111 and 112 each multiply the segment size stored in the segment size register 101 by the transfer count stored in the transfer block specification register 109 and 110. For example, if the segment size is 4 (assuming one segment=4 sectors) and the transfer count is 10, 4×10=40 is output from these circuits. Selectors 113 and 114 select either the multiplication result of the multiplier circuit 111 and 112 or the transfer count stored in the transfer block specification register 109 and 110. If the S bit is 1, the multiplication result is selected, and if the S bit is 0, the transfer count stored in the transfer block specification register 109 and 110. This configuration in accordance with the first embodiment is such that, if the unit of the transfer count has been changed, components such as sector counters 115 and 116 can be used commonly, thus enabling a more compact circuitry and simpler circuit control.

The sector counters 115 and 116 count the number of transfer sectors during data transfer and are decremented by 1 every time one sector of data is transferred. Sector size counters 117 and 118 count the number of transfer bytes during data transfer and are decremented by 1 every time one byte is transferred. Address counters 119 and 120 specify buffer memory addresses during data transfer and are incremented by 1 every time one byte is transferred. Table write address counters 121 and 122 output table addresses when a table is set in the table area from the CPU and are incremented by 1 every time one byte is written on the table area. Note that the outputs of these table write address counters are used during the copying of a table, as is described later. Table read address counters 123 and 124 are used when the table data stored in the table area within the buffer memory is loaded into the transfer block specification registers 109 and 110, and are incremented by 1 every time one byte is loaded. An address selector 125 selects whether the data address is a table read address or table write address in accordance with a specification from an arbiter circuit 126. A timing generation circuit 127 generates the timing signals necessary for reading and writing to the buffer memory. A bus selector 128 selects whether the current data is table data or transfer data in accordance with a specification from the arbiter circuit 126.

The arbiter circuit 126 resolves contentions between transfer requests from two transfer control circuits 129 and 130, and controls the various other components so that the transfer request with the highest priority is permitted. In other words, in this embodiment, four types of data are stored in the buffer memory, which are table data and the data that is actually transferred for the first external interface, as well as table data and the data that is actually transferred for the second external interface. There is only one buffer memory for these four types of data, therefore, a means of arbitrating these data types is necessary when accesses to data conflict. Therefore, in this embodiment an arbiter circuit 126 is provided in which a single buffer memory is used commonly.

The transfer control circuits 129 and 130 generate the timing necessary during data transfer, and their operation is described below.

First, it is assumed that a transfer operation is carried out only on the first external interface 306 side. In this case, table data is set in the host-side table area by the CPU. At this point, the transfer count is specified to be in segment units, so the S bit is set to 1. The number of sectors in one segment is pre-set in the sector size selector 102—in this case it is 2. Assuming that the sector size is 8 bytes. At the point at which the CPU sets the table data, the S bit and the transfer count becomes definite. Thus, a multiplication result is being output immediately through the multiplier circuit 111. In this case, since the S bit is 1, the selector 113 selects the output of the multiplier circuit 111.

Figure 4:
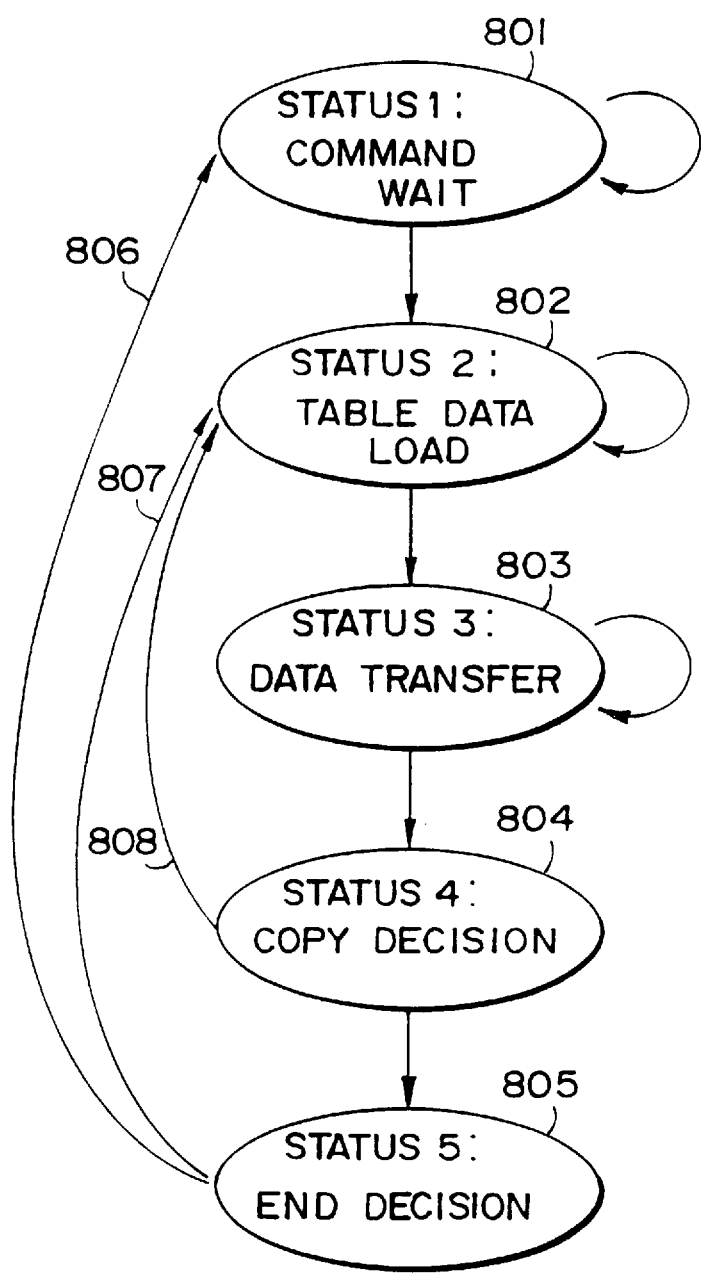
FIG. 4 is a status transition diagram used for describing the operation of the first embodiment.

Next, the CPU starts the transfer control circuit 129 operation by sending a transfer start command to the control register 104. Status transitions of the transfer control circuit 129 are shown in FIG. 4. As shown in FIG. 4, the status of the transfer control circuit 129 changes as follows:

Status 1: Wait for a start command for the CPU. If a start command arrives, the transfer control circuit 129 proceeds to status 2 in order to load the table data.

Figure 5A:
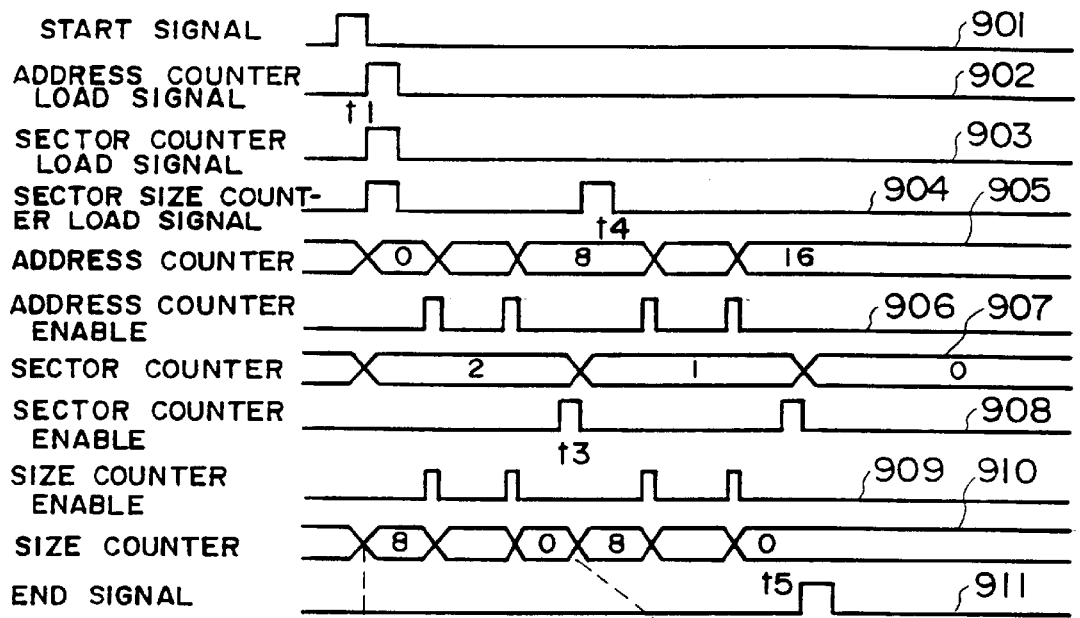
FIG. 5A, FIG. 5B, and FIG. 5C are timing charts used for illustrating the operation of the first embodiment.
Figure 5B:
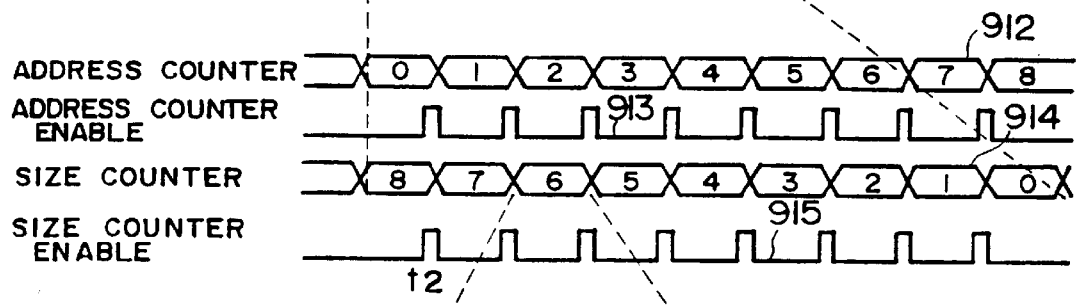
Figure 5C:
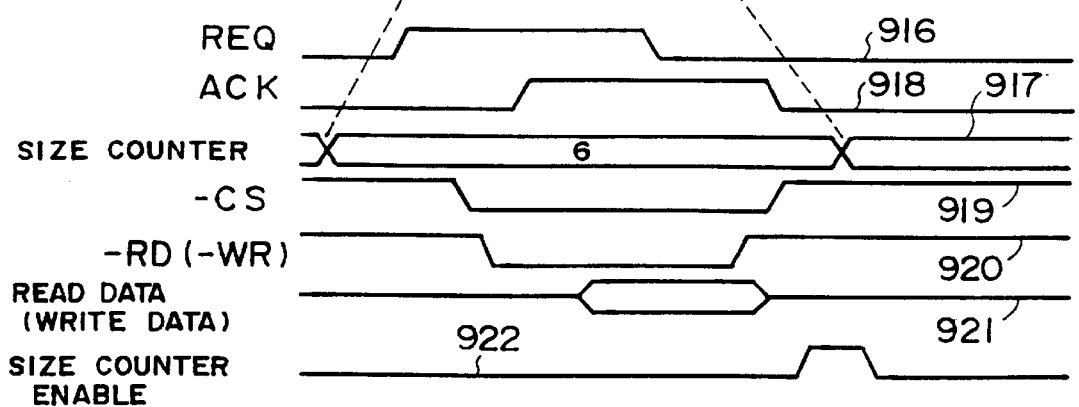

Status 2: The transfer control circuit 129 loads the table data that is stored in the host-side table area into the transfer block specification register 109. In this embodiment, since the transfer block specification register 109 contains only one group of table data, the transfer control circuit 129 proceeds to status 3 when one group of table data is loaded. Note that if there is no table data stored in the transfer block specification register 109 and the transfer control circuit 129 is in status 2, this status is maintained until new table data is stored, Status 3: The transfer control circuit 129 transfers data on the basis of the loaded table data. In this mode of operation of this embodiment, the timing signals shown in the timing chart of FIG. 5A are generated to control the counters. Note that a detailed timing chart of the operation when the size counter value changes from 8 to 0 is shown in FIG. 5B, and a detailed timing chart of REQ and ACK signals when the size counter value is 6 is shown in FIG. 5C.

At a time t1 shown in FIG. 5A, the transfer control circuit 129 first sets a load signal that is input to the sector counter 115, the sector size counter 117, and address counter 119 true, and load the initial counter values. More specifically, 0 is loaded into the address counter 119, 2 into the sector counter 115, and 8 into the sector size counter 117. The timing generation circuit 127 is then activated in response to a REQ signal from the first external interface 306, and one byte of data is transferred. At a time t2 shown in FIG. 5B, the count of the sector size counter 117 is enabled after one byte is transferred, and this sector size counter value is decremented by 1. This changes the value in the sector size counter to 7. At the same time, the count of the address counter 119 is also enabled, and the address counter value is incremented by 1 so that this value is updated from 0 to 1. An ACK signal corresponding to the REQ signal is then returned to the first external interface 306. From here on, byte transfer continues in the same manner, and, when the value in the sector size counter reaches 0, at a time t3 shown in FIG. 5A, the transfer control circuit 129 enables the count of the sector counter, and the sector counter value is decremented by 1 so that this value is updated from 2 to 1. At this point, if the sector counter value if not 0, the load signal that is input to the sector size counter 117 is made true at a time t4 shown in FIG. 5A, and the above-described operation is repeated. If the sector counter value is 0, this table data transfer ends at a time t5 shown in FIG. 5A, and the transfer control circuit 129 proceeds to status 4 as shown in FIG. 4.

Status 4: This relates to a table data copying operation described below. In this particular case, the transfer control circuit 129 does not do anything and proceeds to status 5 unconditionally.

Providing an S bit in this manner in the table data of this embodiment enables the transfer count to be in sector units or segment units. With a storage device that has an access speed as slow as a disk memory device, it is common to have a cache memory on the storage device side to make the access speed appear to be faster. In this case, using data management units for the cache memory that are not sectors, but segments that are accumulations of several sectors each, raises overall efficiency. Therefore, since it is extremely likely that the actual data transfer is in segment units, if a setup in which the transfer count can be specified in segment units is provided, as described in this embodiment, the volume of management information specified from the CPU can be reduced.

Figure 6A:
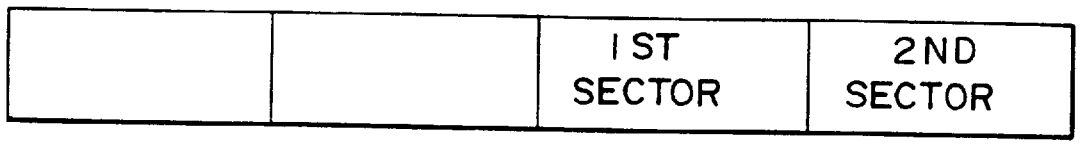
FIG. 6A, FIG. 6B, and FIG. 6C show examples of the correspondences between rows of sectors and rows of segments.
Figure 6B:
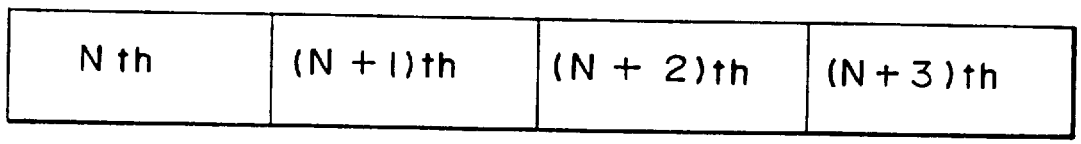
Figure 6C:
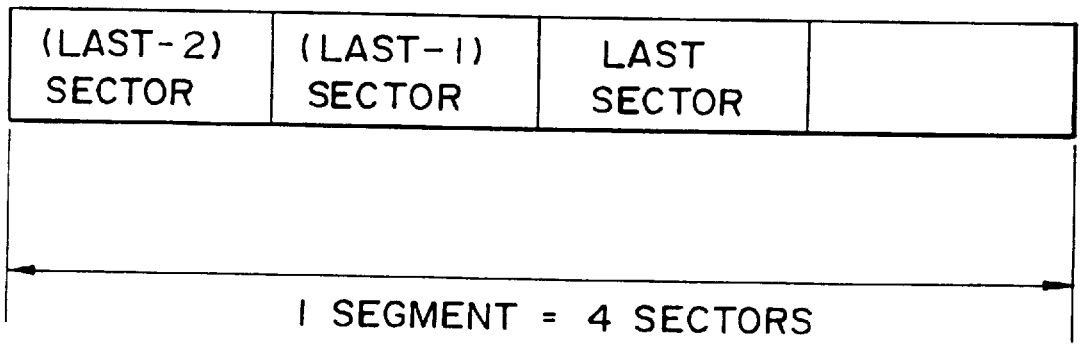

On the other hand, data blocks requested from the host side is inevitably in sector units, and there is no guarantee that they coincide with segment boundaries. Three types of correspondence between rows of sectors and rows of segments can be considered, as shown in FIGS. 6A to 6C. FIG. 6A shows a case in which transfer request sectors start partway through one segment. FIG. 6B shows a case in which the start of the transfer request sectors coincides with the start of a segment, the intermediate segments excluding the start segment and the end segment, and the end sector coincides with the end of that segment. FIG. 6C shows a case in which the transfer request sectors end partway through one segment. In the cases shown in FIG. 6A and FIG. 6C, the S bit is set 0 and the operation is specified with sector units. On the other hand, in the case shown in FIG. 6B, the S bit is set 1 and the operation is specified with segment units. Thus, with this embodiment, the transfer count unit can be selected by the S bit as desired in accordance with the status of the transfer data, and so the efficiency of the data transfer can be greatly increased.

The description now turns to the E bit that is the transfer end parameter. It is assumed for example that the table data area on the host side stores table data for three blocks, as shown in FIG. 3C, and only the E bit in the third item of table data is set 1. The transfer control circuit 129 detects the E bit in the end decision of status 5 in FIG. 4. If the E bit is set 1, the transfer control circuit 129 returns to status 1 and ends the transfer operation. On the other hand, if the E bit is 0, the transfer control circuit 129 returns to status 2, loads table data, and repeats the operations from status 3 onward. Therefore, if the table data is as shown in FIG. 3C, only the E bit in the third item of table data is set 1; thus, the transfer control circuit 129 passes through the following status transitions to complete the transfer operation:

Status 1→status 2→status 3→status 4→status 5→status 2→status 3→status 4→status 5→status 2→status 3→status 4→status 5→status 1

In this manner, the provision of the E bit in this embodiment obviates such means as that in the prior art DMC-2 in which data transfer is ended if the queue buffer becomes empty. Further, since this E bit can be set independently on both the host side and the disk side, the end of data transfer can be controlled independently on the host and disk sides, without affecting the other side.

The description now turns to the copy specification parameter (C bit) and control parameter (M bit). Consider a data transfer from disk to the host as an example of the data transfer operation. First, it is assumed that three items of table data 410, 412, and 414 (shown in FIG. 7A) are written in the table area on the disk side, via the CPU interface 309. A data transfer start command is then sent through the control register 104 on both the disk side and the host side. In this case, since there is as yet no information in the table area on the host side, the transfer operation is stored (status 2 of FIG. 4). In contrast, since there is already table data on the disk side, the first table data is loaded into the transfer block specification register 110. After the table data is loaded, the information in the table data is loaded into the address counter 120 and the sector counter 116, the contents of the sector size register 101 are loaded into the sector size counter 118, and the actual data transfer operation starts (status 3 of FIG. 4). Data from the disk accumulates in the buffer memory until the sector counter value 116 reaches 0.

When the sector counter value 116 reaches 0, since the C bit in the table data 410 is set 1, as shown in FIG. 7A, an operation that copies the disk-side table data 410 and thus generate the host-side table data 420 is performed (status 4 of FIG. 4). The transfer block specification register 110 still contains table data 410 that has just completed the data transfer. Therefore, if the transfer control circuit 130 sends a copy request to the arbiter circuit 126, the arbiter circuit 126 selects the table write address counter 121 for the address selector 125 and the transfer block specification register 110 for the bus selector 128. The arbiter circuit 126 also activates the timing generation circuit 127 and transfers the contents of the transfer block specification register 110 to the table area on the host side. As a result, the host side now has table data 420, and thus the transfer operations starts on the host side as well (status 3 of FIG. 4). On the other hand, the next item of table data 412 is loaded on the disk side and the next data transfer is performed (status 2 and status 3 of FIG. 4). On the host side, the data transfer operation is performed in the same sequence as that on the disk side, on the basis of the copied table data 420. Once the data transfer corresponding to the one item of table data 420 ends, data transfer is temporarily halted until the next item of table data 422 is generated. In this manner, data from the disk side is transferred to the host side, and, when the data transfer controlled by the third item of table data 414 ends on the disk side, the transfer control circuit 130 proceeds to status 5. In this case, since the E bit of the table data 414 is set 1, as shown in FIG. 7A, the transfer control circuit 130 ends the transfer operation (status 1 of FIG. 4).

Figure 3B:
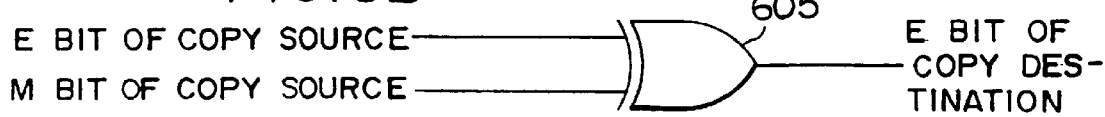
FIG. 3B shows an example of a circuit for generating the E bit at the copy destination.
Figure 3C:
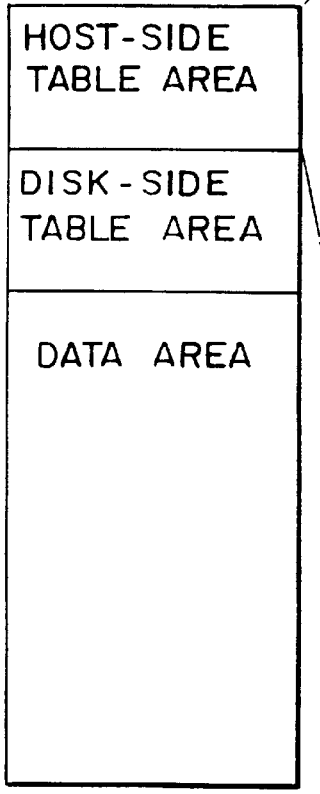
FIG. 3C illustrates a description of the table and data areas in the buffer memory.

The E bit and M bit of the copy source are both input to an exclusive OR circuit 605, as shown in FIG. 3B, and an output from the exclusive OR circuit 605 becomes the E bit of the copy destination. Since the M bit of the disk-side table data 410 is 0, as shown in FIG. 7A, the E bit is copied, and thus the E bit in the host-side table data 420 also becomes 0. Since the M bit of the third data item 414 on the disk side is also 0, the E bit which is 1 copied to the host side, and the E bit in the host-side table data 424 also becomes 1. Therefore, on the host-side too, when the data transfer corresponding to the third item of table data 424 ends, the data transfer ends because the E bit of the table data 424 is set 1. Such copy function in this embodiment of the invention facilitates the implementation of data transfer from the disk to the host, by writing table data from the CPU interface 309 to only the disk side. Data transfer from the host side to the disk side is also facilitated in exactly the same way.

Note that, as should be clear from FIG. 7A, the C bit is not transferred to the copy destination because the C bit of the table data at the copy destination does not become 1, even if the C bit of the table data at the copy source is 1. If the C bit at the copy destination should become 1, the copy from the copy destination to the copy source is repeated due to an error.

The above transfer condition of FIG. 7A presents a condition in which the transfer area for the disk data is superimposed on that for the host data. In other words, with this transfer condition, both the E bit and the M bit of the table data, except for the last table data 414, are 0, and the C bit is 1. Only in the last table data 414 the E bit is 1, the M bit is 0, and the C bit is 1. However, when a cache memory type of operation is carried out, the table data is set in such manner as shown in FIG. 7B. This is the case when out of three data blocks, only the first data block is read from disk, and the remaining two blocks are hit and are already in the buffer memory. Only one item of table data 430 is set on the disk side, and all of the E bit, M bit, and C bit of this table data 430 are set 1. Since the E bit on the disk side is 1, the data transfer on the disk side ends with the table data 430. However, the M bit of the table data 430 is 1, and thus the E bit of the table data 440 on the host side becomes 0, without having to copy the E bit to the host side. As a result, the host side does not reach end status, even when the data transfer operation for the table data 430 ends. For the subsequent hit data, the remaining two items of table data 442 and 444 are set in the host side only, and the data transfer operation from the buffer memory to the host side continues.

If the read-ahead method is introduced, the setting of the table data is as shown in FIG. 7C. With this read-ahead method, three blocks of data are read ahead from the disk and are stored in the buffer memory, and only the first data block of the table data need be transferred to the host side. Thus, in this case, only the E bit of table data 450 is set 0, with the M bit and C bit set 1, as shown in FIG. 7C, and all of the E bit, M bit, and C bit of table data 452 are set 1. The E bit of table data 454 is set 1, and both the M bit and the C bit are set 0. When data transfer on the disk side in accordance with the table data 450 ends, this table data 450 is copied to the host side to generate table data 460. At this point, the exclusive OR circuit 605 shown in FIG. 3B inverts the E bit, so that the data is copied with the E bit being 1. Thus, the host side determines that this table data 460 is the last table data. As a result, the data transfer operation for the second and third data blocks ends without any transfer to the host side, by simply storing the data from the disk in the buffer memory.

In accordance with this embodiment as described above, data transfers can be carried out in various methods by using the M bit in combination with the E bit. This description has dealt only with the data read operation as seen from the host side, but it can easily be understood that such data transfer methods can also be applied to a data write operation in a similar manner. In this embodiment, the table area is located within an external buffer memory, but the present invention is not limited to such a narrow application range—it can implement similar functions even when the table area is located within the LSI.

Second Embodiment

Figure 8:
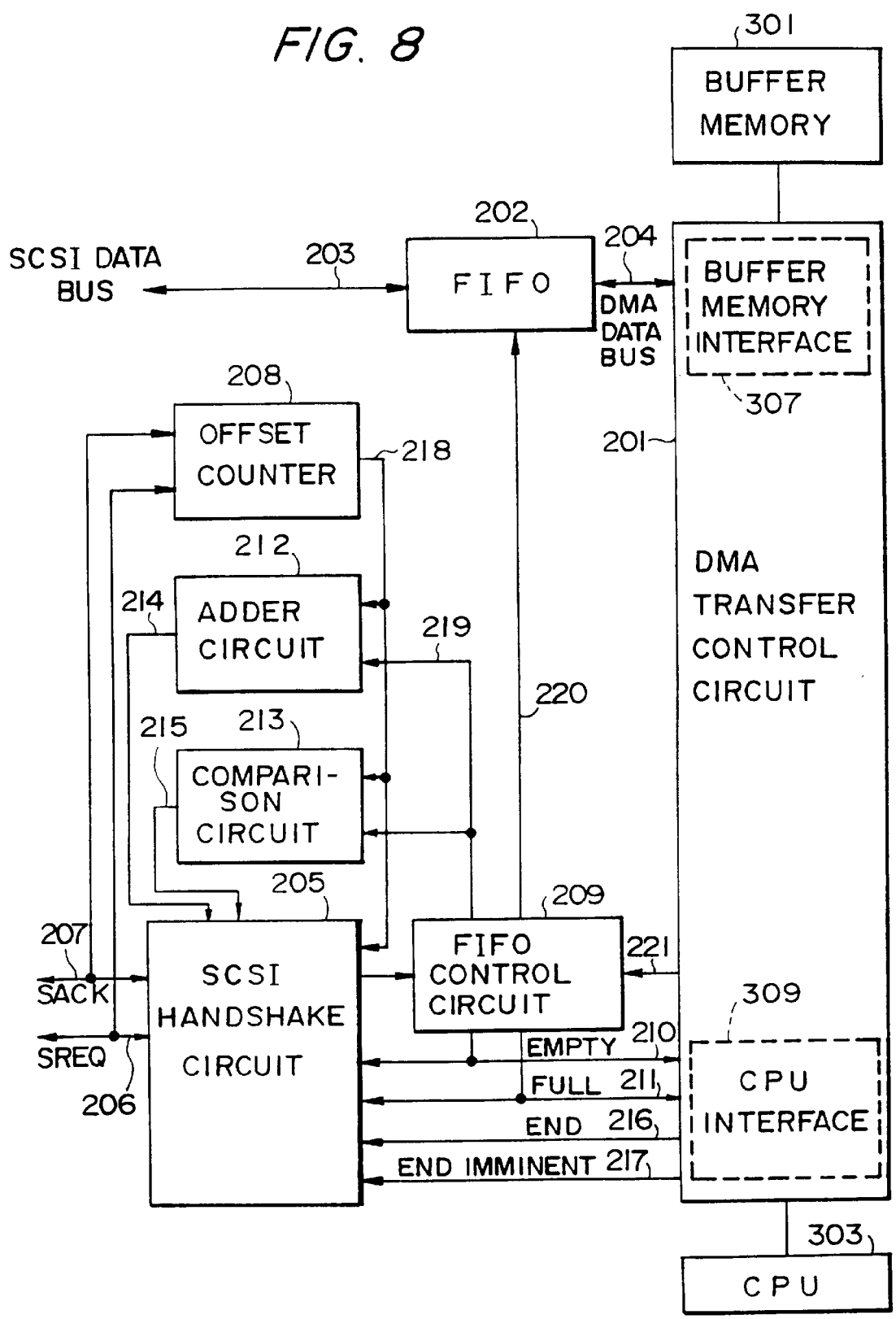
FIG. 8 is a block diagram of a second embodiment of this invention.

In a second embodiment of this invention, the SCSI controller and DMA transfer control circuit are configured on a single chip. A block diagram of an example of this second embodiment is shown in FIG. 8.

Figure 9A:
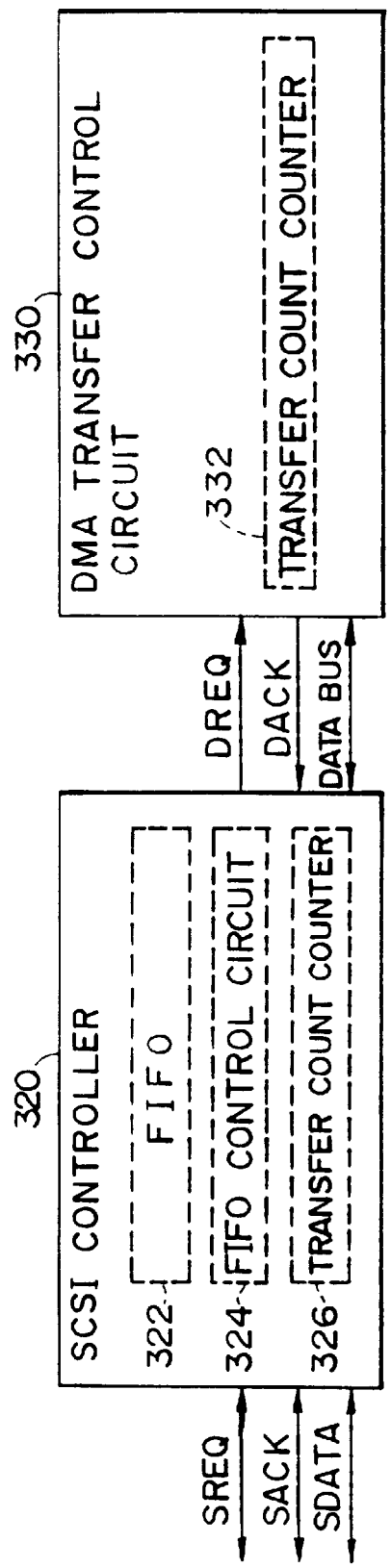
FIG. 9A and FIG. 9B are diagrams used for illustrating a problem with a configuration in which the SCSI controller and the DMA transfer control circuit are on a single chip.

For reference, an example of a data transfer control device configured of two chips, a SCSI controller 320 LSI and a DMA transfer control circuit 330 LSI, is shown in FIG. 9A. In this case, the SCSI controller 320 has a FIFO 322, a FIFO control circuit 324, and a transfer count counter 326, and the DMA transfer control circuit 330 also has a transfer count counter 332. In other words, in the configuration shown in FIG. 9A, a transfer count counter 326 or 332 is present in each of the LSIs, so that transfer end can be detected in each LSI.

Figure 9B:
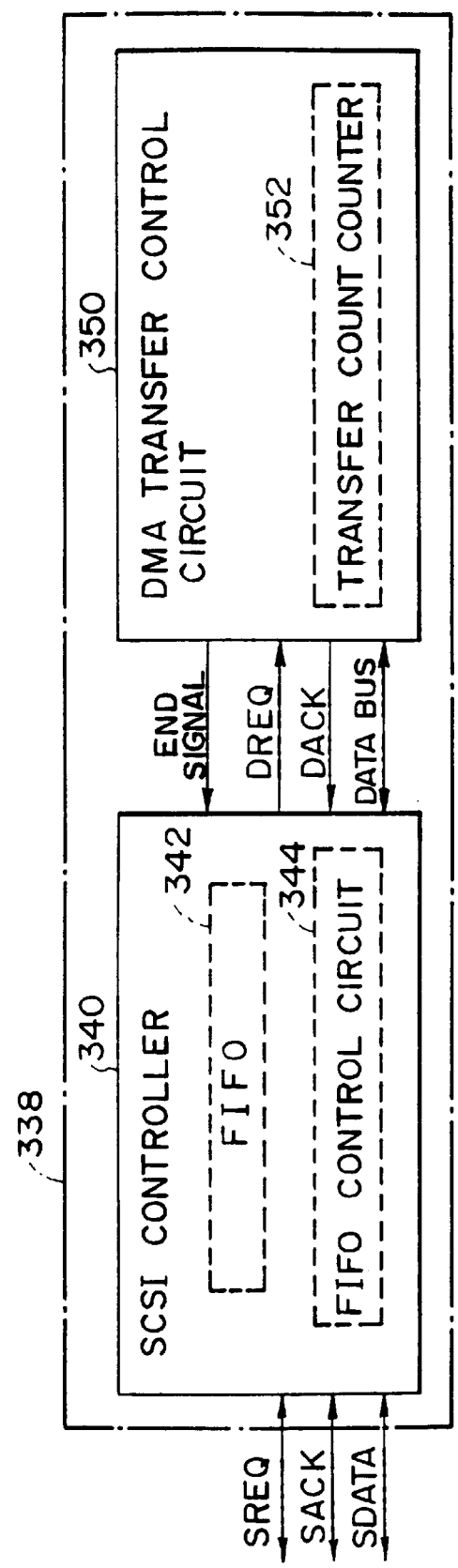

In contrast, an example of a SCSI controller 340 and a DMA transfer control circuit 350 configured on a single chip, an LSI 338, is shown in FIG. 9B. In this case, in order to reduce the circuitry size or prevent bugs during program development, it is preferable to have a configuration in which a transfer count counter 352 is provided on the DMA transfer control circuit 350 side only, as shown in FIG. 9B but not on the SCSI controller 340 side. However, with such a configuration, transfer end can be detected by the transfer count counter 352 on the DMA transfer control circuit 350 side, but not on the SCSI controller 340 side lacking a transfer count counter. Thus this second embodiment employs a method in which an end signal is output from the DMA transfer control circuit 350 to the SCSI controller 340 to indicate that the current data is the last transfer data. In this manner, by outputting an end signal at the same time as the transfer of the last data, the SCSI controller side can also detect transfer end and can thus end the operation.

However, even with a configuration that outputs an end signal in this manner, some problems still remain, as will be discussed below. In other words, although there are virtually no problems when this LSI 338 outputs an SDATA signal to the outside, it is possible that the presence of the FIFO 342 could cause a problem of excess SDATA signals when these signals are input from the external devise. This problem may confuse the external devise, and it is likely that the entire system malfunctions. Note that "FIFO" means a "First-In, First-Out" memory, from which data is output in the same sequence it is input. A memory of this type is used for temporarily absorbing any differences in transfer speed between the SCSI data bus and the DMA transfer control circuit.

The reasons for having a FIFO within the SCSI controller are discussed below. There are two SCSI transfer methods: using asynchronous mode and synchronous mode. In this case, asynchronous mode is a mode in which a handshake method is used to transfer data one byte at a time under timing control provided by SREQ and SACK signals. Therefore, a FIFO is not absolutely necessary in asynchronous mode. In contrast, synchronous mode is a method of transferring data in synchronism with the SREQ signal (or the SACK signal). There is no handshake with the SACK signal (or the SREQ signal) and data is transferred unilaterally. With this synchronous mode, delays in signal propagation concomitant with the handshake can be absorbed, and a faster transfer speed is possible than with the asynchronous method. However, data is transferred unilateraly with some limits, and one of the factors that determines these limits is the storage capacity of the FIFO. The number of generated SREQ pulses counted since the transfer start, minus the number of generated SACK pulses is called the value in an offset counter, and the maximum offset counter value corresponds to the storage capacity of the FIFO memory. The average transfer speed increases with the value in the offset counter. In other words, increasing the storage capacity of the FIFO increases the transfer speed accordingly.

In any case, a FIFO is necessary for enabling synchronous mode. On the other hand, this FIFO makes it not possible to stop the SCSI data transfer accurately by simply outputting an end signal from the DMA transfer control circuit to the SCSI controller. In other words, it is thought that not only could the previously described excessive data input occur, but also excessive SREQ signals could be generated or data transfer could end before the SACK signal is completely returned. In order to prevent these errors and make sure that data transfer ends accurately, this second embodiment generates a signal that posts that the remaining transfer count has become equal to the FIFO storage capacity (end imminent signal), a signal that posts that the FIFO is empty i.e., the FIFO empty capacity has become equal to the FIFO storage capacity (empty signal), and a signal that posts that the FIFO storage capacity has become full (full signal). A means for adding the offset counter value to the FIFO empty capacity, and a means for comparing the offset counter value with the FIFO empty capacity are provided. In accordance with this second embodiment, the circuitry size required for generating these signals and providing these means can be made smaller than the circuitry size required for the transfer count counter, and this can help reduce the entire circuitry. The effects of the second embodiment is particularly notable when the number of bits of the transfer count counter and the buffer capacity increase.

This example of the configuration of this second embodiment is now described in detail with reference to FIG. 8. In FIG. 8, a DMA transfer control circuit (data transfer control means) 201 is a circuit that can implement block data transfer in the same manner as the DTRC of the previously described first embodiment. A SCSI handshake circuit (interface control means) 205 controls transferring data in accordance with a handshake between an SREQ signal 206 and an SACK signal 207. For example, if this LSI is operating as data in phase in target mode, the SREQ signal becomes the output signal and the SACK signal becomes the input signal, the data is output from the FIFO 202 to the outside. Conversely, if this LSI is operating as data out phase in target mode, data is input to the FIFO 202. An offset counter 208, which is necessary for operation in synchronous mode, calculates the difference between the number of generated SREQ pulses and the number of generated SACK pulses. A FIFO control circuit 209 controls access to the FIFO 202 from the DMA transfer control circuit 201 and the SCSI handshake circuit 205. The FIFO control circuit 209 also has a counter that counts the number of data items in the FIFO 202. The circuit 209 outputs an empty signal 210 indicating that this count has reached 0, and a full signal 211 indicating that the FIFO storage capacity (in this embodiment, it is 16 bytes) has become full, and these signals are output to the DMA transfer control circuit 201 and the SCSI handshake circuit 205. An adder circuit 212 adds the FIFO counter value of the FIFO control circuit 209 to the offset counter value, and an output 214 thereof is input to the SCSI handshake circuit 205. A comparison circuit 213 compares the FIFO counter value and the offset counter value, and an output 215 thereof is input to the SCSI handshake circuit 205. An end signal 216 that indicates that the transfer count counter value within the DMA control circuit has reached 0 and an end imminent signal 217 that indicates that the transfer count counter value has reached the size of the FIFO storage capacity are output from the DMA transfer control circuit 201 and input to the SCSI handshake circuit 205.

The operation of this second embodiment is now described. There are eight sets of transfer conditions in this second embodiment, based on all possible combinations of: asynchronous or synchronous, initiator or target, and data in phase or data out phase. These transfer conditions are described below in sequence.

1. Asynchronous Initiator Data Out Phase

Figure 10:
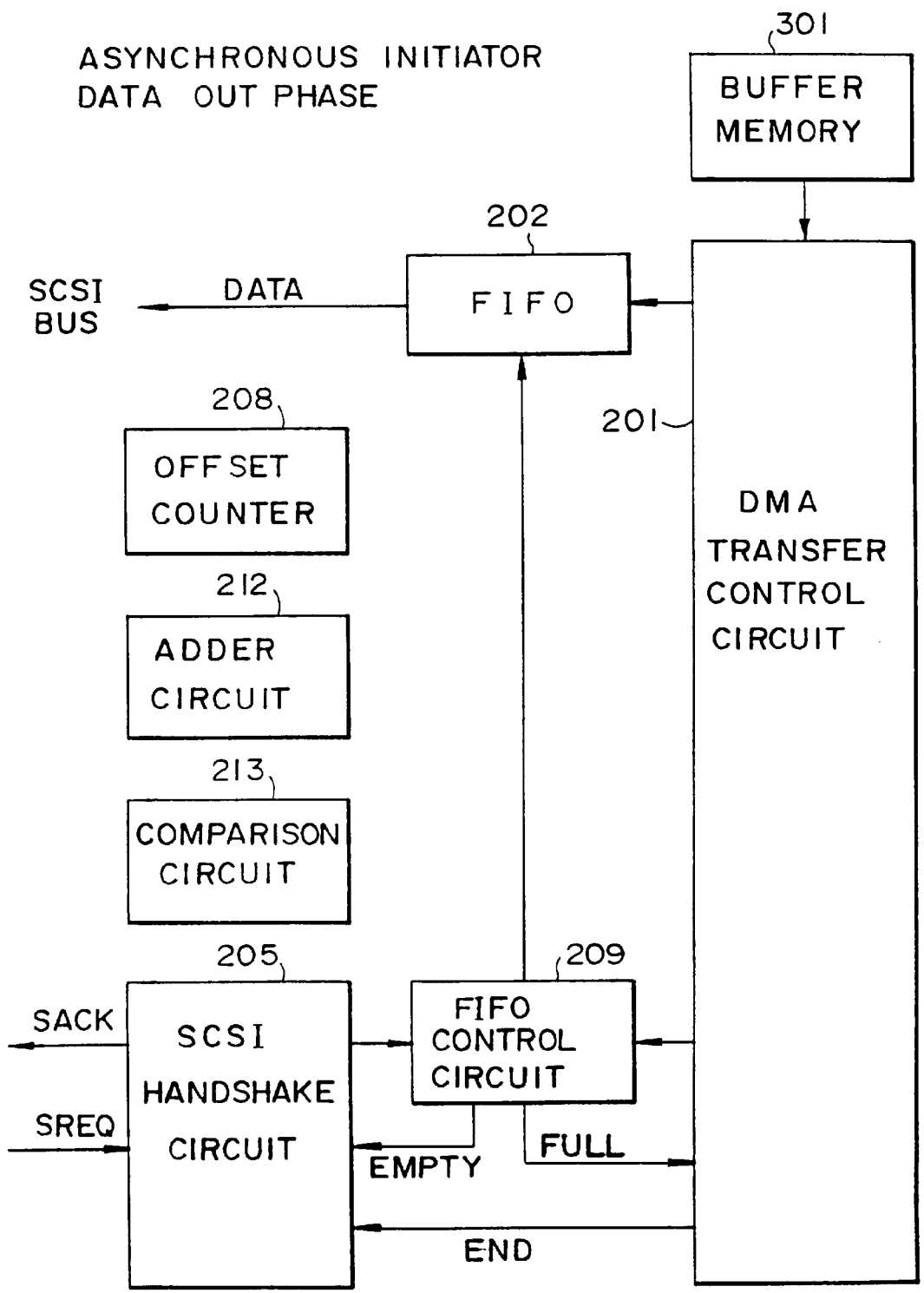
FIG. 10 shows signal flows during asynchronous initiator data out phase.
Figure 11:
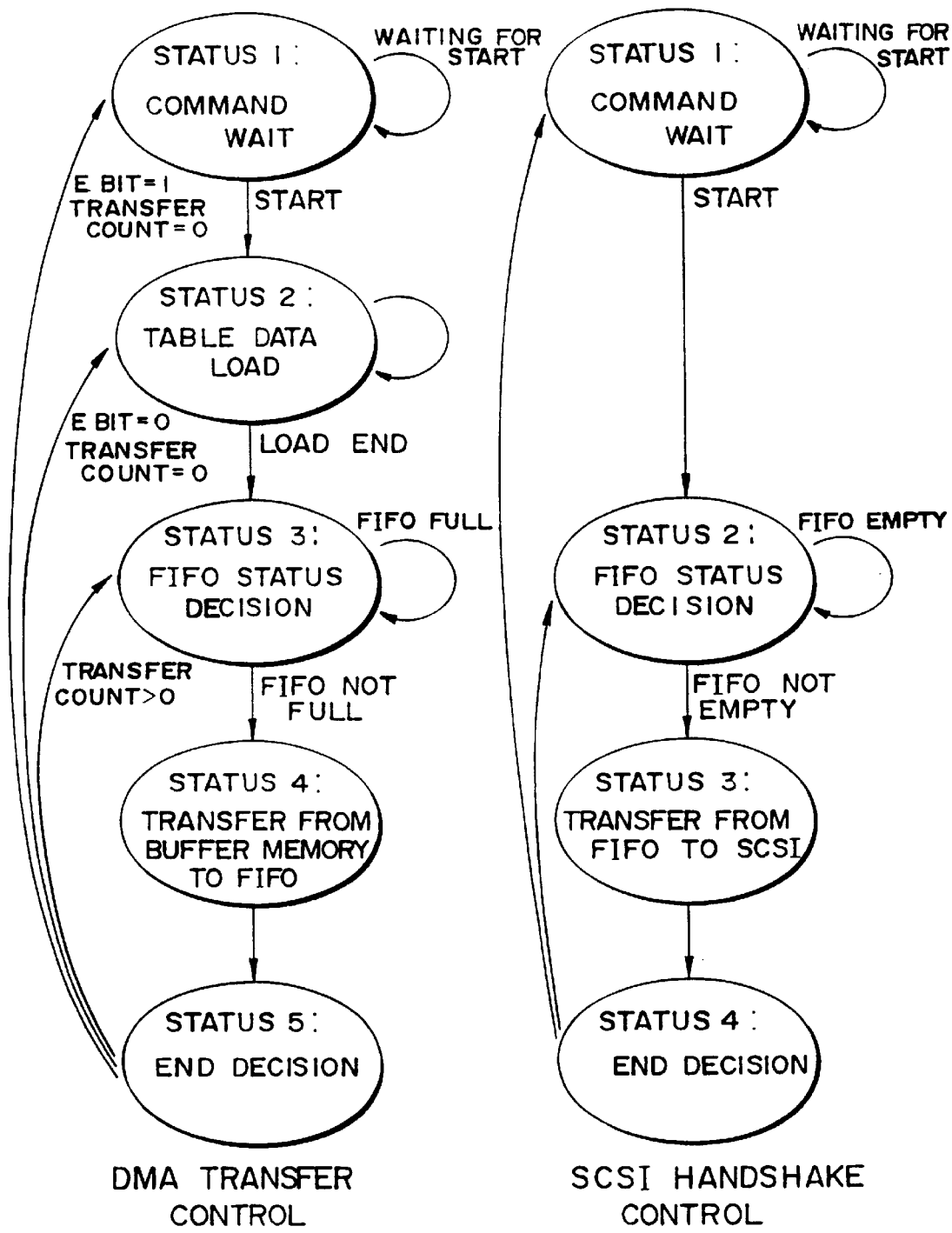
FIG. 11 shows status transitions during asynchronous initiator data out phase.

In this case, data is output from this LSI to the SCSI bus as shown in FIG. 10. The status transitions on the SCSI handshake side and the DMA transfer control circuit side during this process are shown in FIG. 11. Both the DMA transfer control circuit and SCSI handshake circuit are activated by a transfer start command from the CPU.

1-1. DMA-Side Status Transitions

Status 1: Wait for start command. If a start command arrives, the DMA transfer control circuit proceeds to status 2.

Status 2: Table data load. After loading the table data, the DMA transfer control circuit proceeds to status 3.

Status 3: FIFO status verification. If the FIFO is not full, the DMA transfer control circuit proceeds to status 4. If it is full, the DMA transfer control circuit remains at status 3. In other words, data is output in this case from the buffer memory (DMA transfer control circuit) to the FIFO, as shown in FIG. 10, but if the FIFO is full, data cannot be input to the FIFO. Therefore, on outputting data from the buffer memory, it is necessary to check whether or not the FIFO is full. Note that, whether or not the FIFO is full is determined by a full signal from the FIFO control circuit, as shown in FIG. 10.

Status 4: If it is decided in status 3 that the FIFO is not full, data is transferred from the buffer memory to the FIFO.

Status 5: End decision. If the transfer count counter value is not 0, the DMA transfer control circuit returns to status 3 and repeats statuses 3 to 5 until the transfer count value is 0. If the E bit is set 1 and the transfer count counter value is 0, it is determined that data transfer has ended, and the DMA transfer control circuit outputs the end signal to the SCSI handshake circuit side (see FIG. 10) and returns to status 1. On the other hand, if the E bit is 0, it is determined that the next table data is not yet available, and the DMA transfer control circuit returns to status 2 to load the next table data. Note that the transfer count counter in this second embodiment corresponds to, for example, the sector counter and sector size counter of the first embodiment.

1-2. SCSI-Side Status Transitions

Status 1: Wait for start command. If a start command arrives, the SCSI handshake circuit proceeds to status 2.

Status 2: FIFO status verification. If the FIFO is not empty, the SCSI handshake circuit proceeds to status 3. If it is empty, the SCSI handshake circuit remains at status 2. In other words, data is output in this case from the FIFO to the SCSI bus, but if the FIFO is empty, data cannot be output from the FIFO. Therefore, on outputting data from the FIFO, it is necessary to check whether or not the FIFO is empty. Note that, whether or not the FIFO is empty is determined by an empty signal from the FIFO control circuit.

Status 3: Since this is asynchronous mode, data in the FIFO is output to the SCSI bus together with the SACK signal, on the basis of an SREQ signal from the target on the SCSI bus.

Status 4: End decision. If the FIFO is empty and also an end signal has been input from the DMA transfer control circuit, it is determined that there is no transfer data in either the FIFO or the buffer memory, so the SCSI handshake circuit ends the transfer operation and returns to status 1. Otherwise, it returns to status 2 and repeats statuses 2 to 4.

2. Asynchronous Initiator Data In Phase

Figure 12:
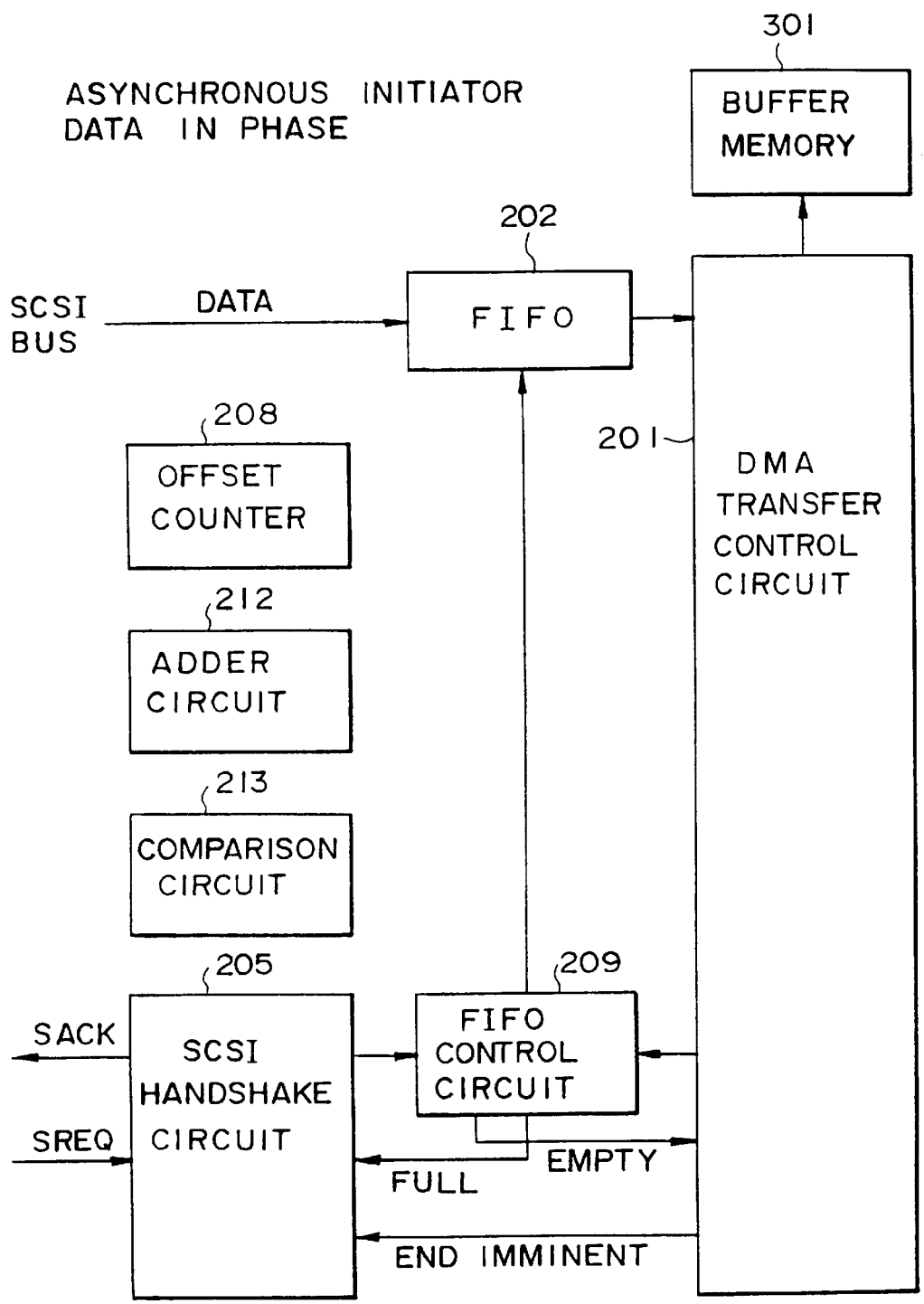
FIG. 12 shows signal flows during asynchronous initiator data in phase.
Figure 13:
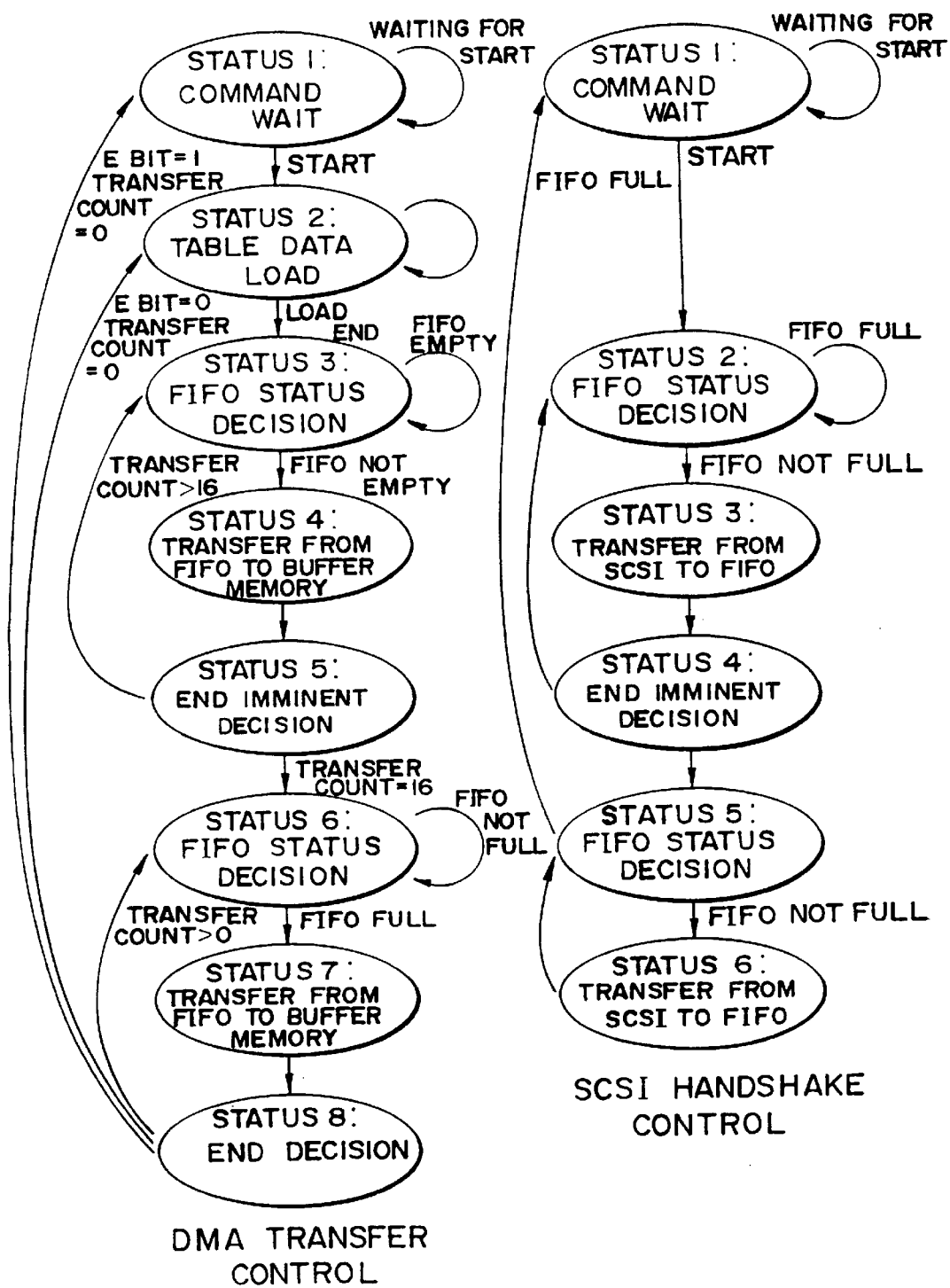
FIG. 13 shows status transitions during asynchronous initiator data in phase.

In this case, data is input from the SCSI bus to this LSI, as shown in FIG. 12. Status transition diagrams are shown in FIG. 13. Both the DMA transfer control circuit and SCSI handshake circuit are activated by a transfer start command from the CPU.

2-1. DMA-Side Status Transitions

Status 1: Wait for start command. If a start command arrives, the DMA transfer control circuit proceeds to status 2.

Status 2: Table data load. After loading the table data, the DMA transfer control circuit proceeds to status 3.

Status 3: FIFO status verification. If the FIFO is not empty, the DMA transfer control circuit proceeds to status 4. If it is empty, the DMA transfer control circuit remains at status 3. In other words, data is input in this case from the FIFO to the buffer memory, but if the FIFO is empty, data cannot be output from the FIFO. At this point, a decision is made as to whether or not the FIFO is empty, on the basis of an empty signal from the FIFO control circuit (see FIG. 12).

Status 4: If it is decided in status 3 that the FIFO is not empty, data is transferred from the FIFO to the buffer memory.

Status 5: End imminent decision. If the transfer count counter value is not 16 (=FIFO storage capacity), the DMA transfer control circuit returns to status 3 and repeats status 3 to status 5 until the transfer count counter value is 16. If the value is 16, it is determined that the transfer count counter value has become equal to the FIFO storage capacity, and the DMA transfer control circuit outputs an end imminent signal to the SCSI handshake circuit side to indicate that the end of data transfer is close, then it proceeds to status 6.

Status 6: FIFO status decision. If the FIFO is full, the DMA transfer control circuit proceeds to status 7. If it is not full, the DMA transfer control circuit remains at status 6.

Status 7: If it is determined in status 6 that the FIFO is full, data is transferred from the FIFO to the buffer memory. In other words, after outputting the end imminent signal in status 5, the DMA transfer control circuit waits until the FIFO becomes full (status 6), then transfers data from the FIFO to the buffer memory once it has become full.

Status 8: End decision. If the E bit is 1 and the transfer count counter value is 0, it is determined that data transfer has ended, and the DMA transfer control circuit returns to status 1. On the other hand, if the E bit is 0 and the transfer count counter value is 0, it is determined that the next table data is yet available, and the DMA transfer control circuit returns to status 2 to load the next table data. If the transfer count counter value is not 0, the DMA transfer control circuit returns to status 6 repeats statuses 6 to 8 until the transfer count counter value is 0.

2-2. SCSI-Side Status Transitions

Status 1: Wait for start command. If a start command arrives, the SCSI handshake circuit proceeds to status 2.

Status 2: FIFO status verification. If the FIFO is not full, the SCSI handshake circuit proceeds to status 3. If it is full, the SCSI handshake circuit remains at status 2. In other words, data is input in this case from the SCSI bus to the FIFO, but if the FIFO is full, data cannot be input to the FIFO. At this point, a decision is made as to whether or not the FIFO is full, on the basis of a full signal from the FIFO control circuit (see FIG. 12).

Status 3: Since this is asynchronous mode, data on the SCSI bus is input to the FIFO on the basis of an SREQ signal from the target on the SCSI bus.

Status 4: End imminent decision. If an end imminent signal is input from the DMA transfer control circuit, the SCSI handshake circuit proceeds to status 5. Otherwise, it returns to status 2 and repeats statuses 2 to 4.

Status 5: FIFO status decision. If the FIFO is full, the SCSI handshake circuit ends the transfer and returns to status 1. If the FIFO is not full, the SCSI handshake circuit proceeds to status 6.

Status 6: The SCSI handshake circuit transfers data on the SCSI bus to the FIFO, on the basis of the SREQ signal. After the transfer, the SCSI handshake circuit returns to status 5 and repeats statuses 5 and 6 until the FIFO becomes full.

Using the end imminent signal as described above can prevent the input of excessive data to the FIFO. In other words, when the transfer count counter value becomes equal to the FIFO storage capacity (=16), the DMA transfer control circuit outputs an end imminent signal to the SCSI handshake circuit and then waits until the FIFO becomes full. When the end imminent signal is input to the SCSI handshake circuit, it inputs data from the SCSI bus into the FIFO until the FIFO becomes full. When the FIFO becomes full, the SCSI handshake circuit ends the data transfer, preventing the input of excessive data to the FIFO. On the other hand, the DMA transfer control circuit, at the stage at which the FIFO becomes full, restarts data transfer from the FIFO to the buffer memory, and thus 16 items of data can be transferred as appropriate to the buffer memory after the end imminent signal is output.

3. Asynchronous Target Data Out Phase

Figure 14:
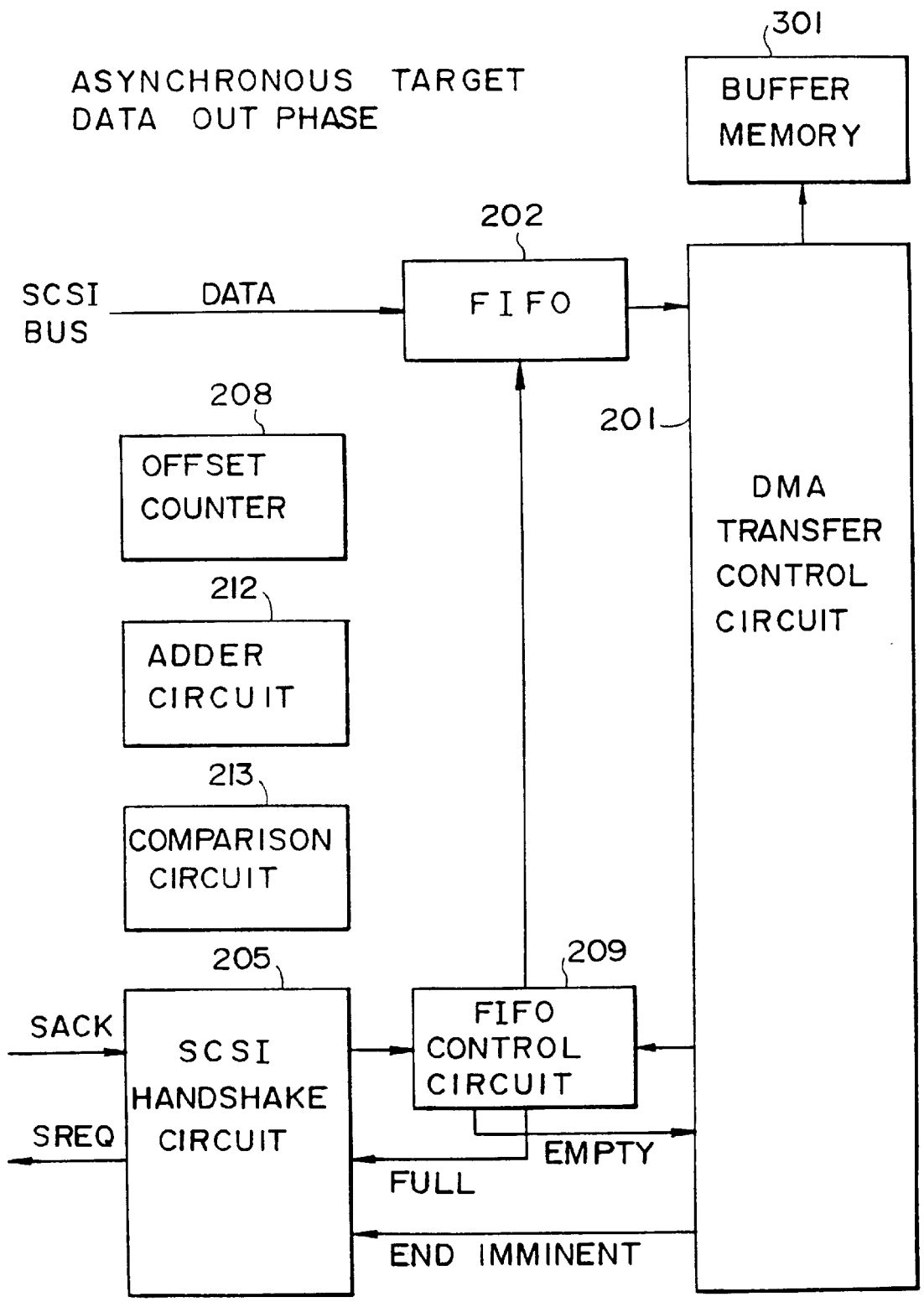
FIG. 14 shows signal flows during asynchronous target data out phase.

Data transfer by SCSI from an initiator to a target is called data out phase, so that, in this case, data is input from the SCSI bus to this LSI that is the target, as shown in FIG. 14. Both the DMA transfer control circuit and SCSI handshake circuit are activated by a transfer start command from the CPU. The processing flow is basically the same as that described in Section 2, Asynchronous Initiator Data In Phase, but it should be clear from a contrast of FIGS. 12 and 14 it differs from that of Section 2 in that the SREQ signal is output and the SACK signal is input. This is because, from the SCSI viewpoint, the SREQ signal is output from the target side and the SACK signal is output from the initiator side.

4. Asynchronous Target Data In Phase

Figure 15:
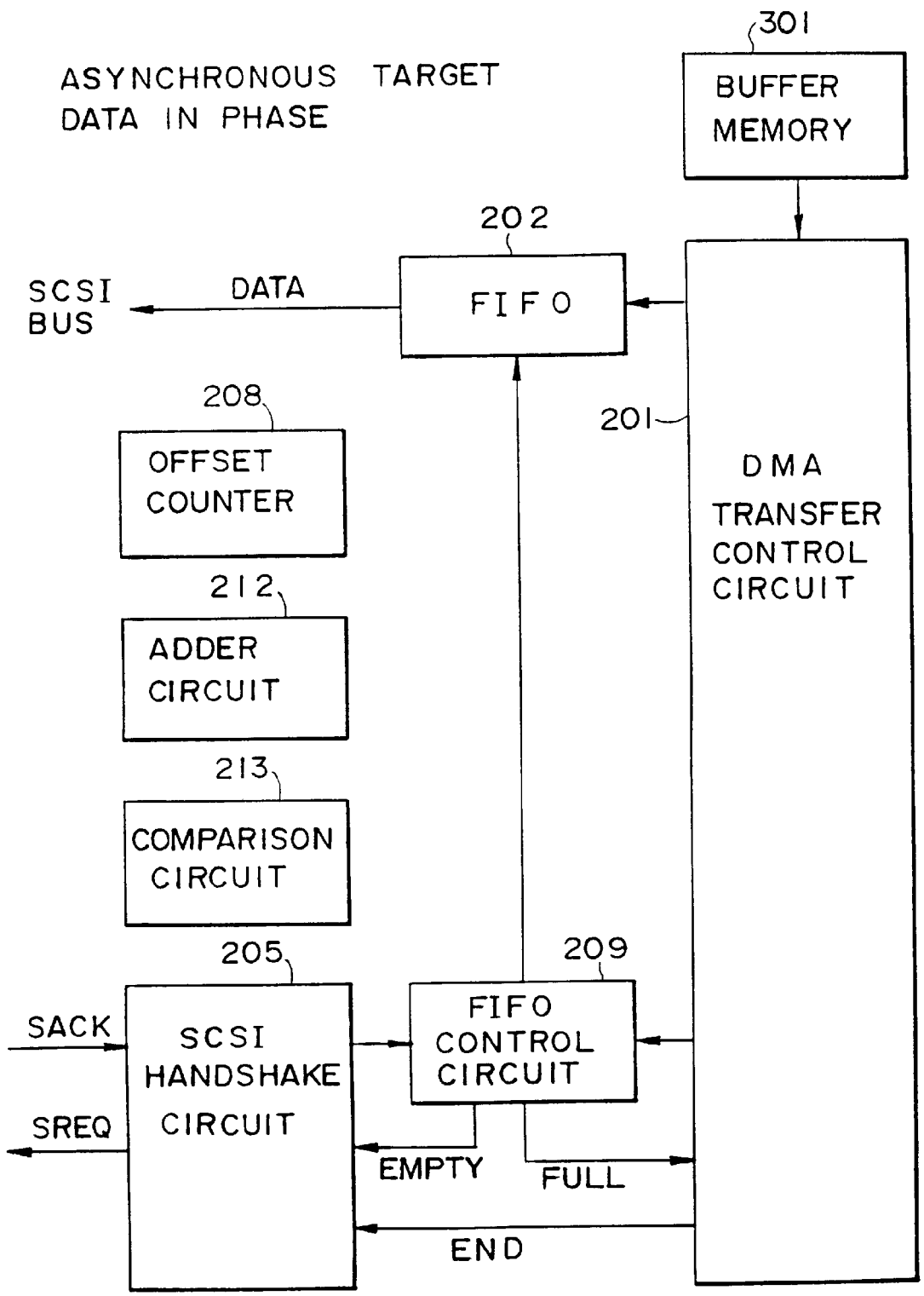
FIG. 15 shows signal flows during asynchronous target data in phase.

Data transfer by SCSI from a target to an initiator is called data in phase, so that, in this case, data is output from this LSI to the SCSI bus, as shown in FIG. 15. Both the DMA transfer control circuit and SCSI handshake circuit are activated by a transfer start command from the CPU. The processing flow is basically the same as that described in Section 1, Asynchronous Initiator Data Out Phase, except that it differs from that of Section 1 in that the SREQ signal is output and the SACK signal is input.

5. Synchronous Initiator Data Out Phase

Figure 16:
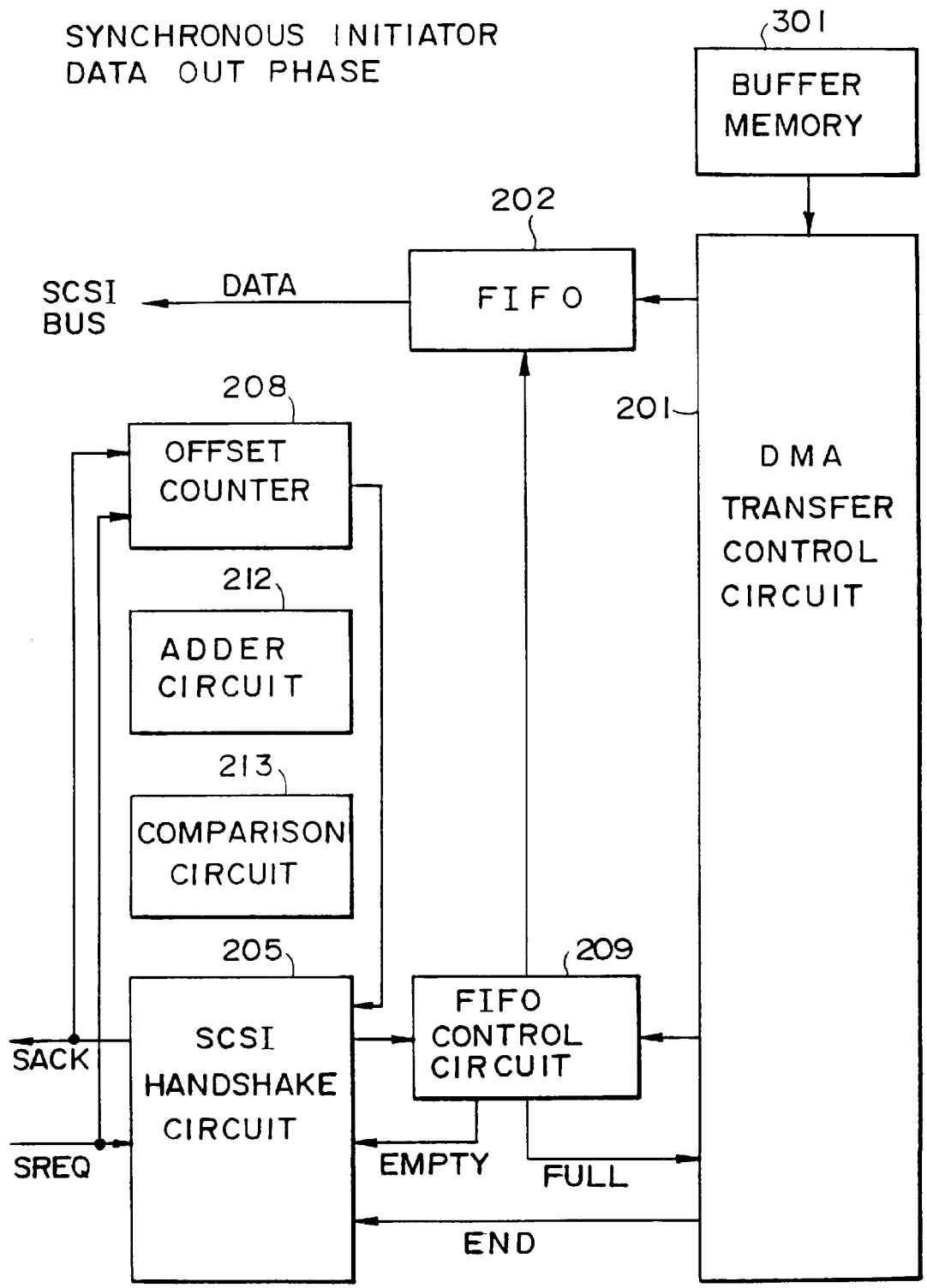
FIG. 16 shows signal flows during synchronous initiator data out phase.
Figure 17:
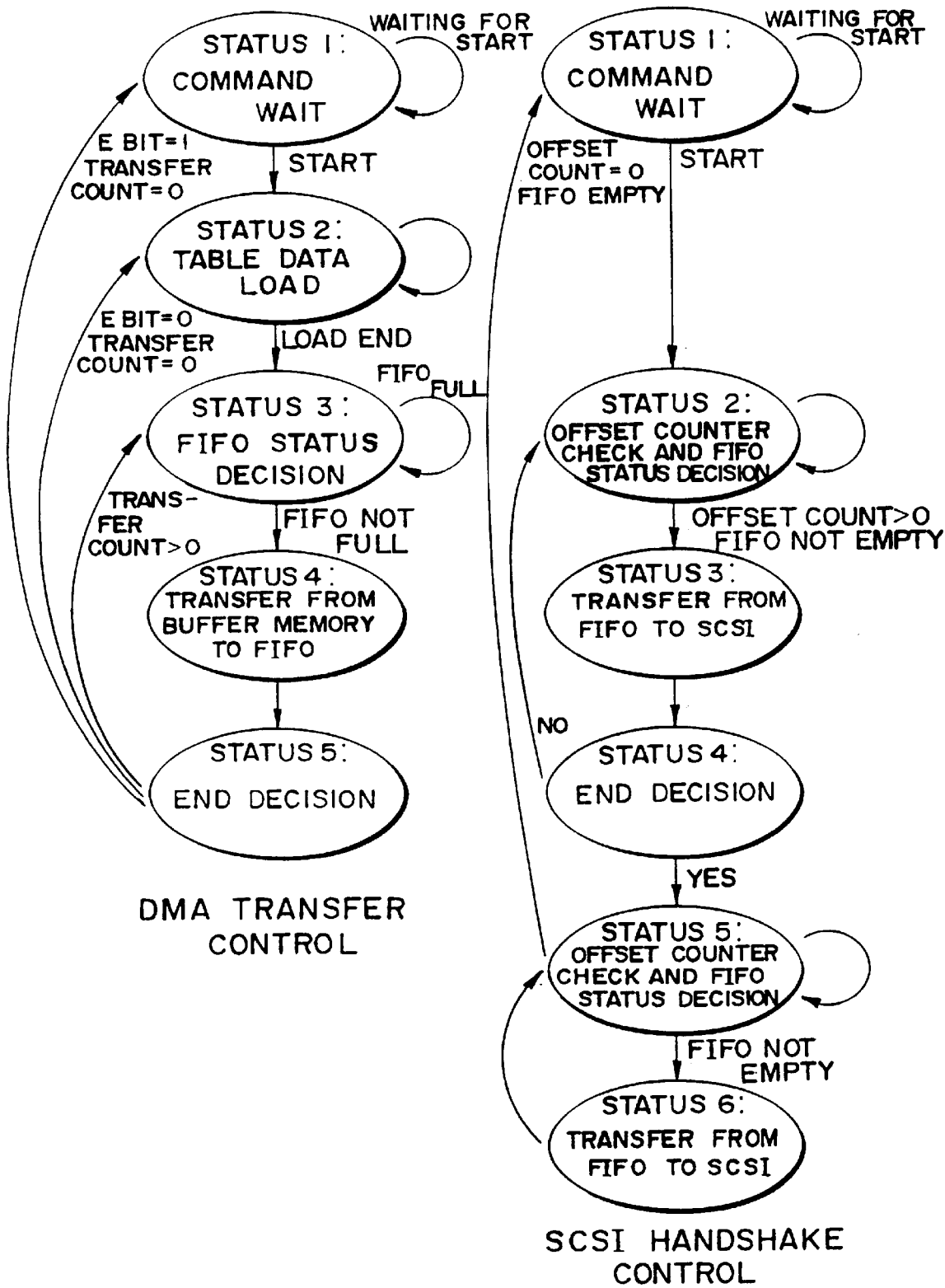
FIG. 17 shows status transitions during synchronous initiator data out phase.

In this case, data is output from this LSI to the SCSI bus, as shown in FIG. 16. Since the transfer in this case is synchronous, SREQ pulses are propagated and output in a range that does not exceed a previously determined maximum offset. Therefore, transfer control that takes this into consideration must be provided. Status transition diagrams are shown in FIG. 17. Both the DMA transfer control circuit and SCSI handshake circuit are activated by a transfer start command from the CPU.

5-1. DMA-Side Status Transitions

The DMA status transitions are the same as those described in Section 1 (refer to and compare FIG. 11 and FIG. 17), and thus description thereof is omitted.

5-2. SCSI-Side Status Transitions

Status 1: Wait for start command. If a start command arrives, the SCSI handshake circuit proceeds to status 2.

Status 2: Offset counter check and FIFO status decision. If the offset counter value (=SREQ−SACK) is greater than 0 and the FIFO is not empty, the SCSI handshake circuit proceeds to status 3. Otherwise, it remains at status 2.

Status 3: Data transfer from FIFO to SCSI. The SCSI handshake circuit outputs data to the SCSI bus in synchronization with SACK pulses. During this time, the offset counter is always operating, and the offset counter value is decremented by 1 by each SACK pulse that is output. SREQ is input unilaterally from the target on the SCSI bus. Therefore, this LSI is able to output SACK pulses within a range in which the number of generated SACK pulses does not exceed the number of generated SREQ pulses and perform the data transfer. In this case, status 2 determines whether or not the offset counter value (=SREQ−SACK) is greater than 0, and status 3 outputs the SACK pulses while this value is greater than 0.

Status 4: End decision. If the end signal is output from the DMA transfer control circuit, the SCSI handshake circuit proceeds to status 5. Otherwise, it returns to status 2 and repeats statuses 2 to 4.

Status 5: Offset counter check and FIFO status decision. If the FIFO is not empty, the SCSI handshake circuit proceeds to status 6. If the offset counter value is 0 and the FIFO is empty, the SCSI handshake circuit returns to status 1. Otherwise, it remains at status 5. This guarantees that data transfer does not end so long as the offset counter value is not 0. As a result, this can prevent the error in which data transfer ends before the SACK signal corresponding to the SREQ signal has completely returned to the target.

Status 6: Data transfer from FIFO to SCSI. The SCSI handshake circuit outputs data to the SCSI bus in synchronization with SACK pulses, and repeats status 5 and status 6 until the FIFO becomes empty. During this time, the offset counter is always operating, and the offset counter value is decremented by 1 by each SACK pulse that is output of the SCSI hand shake circuit.

6. Synchronous Initiator Data In Phase

Figure 18:
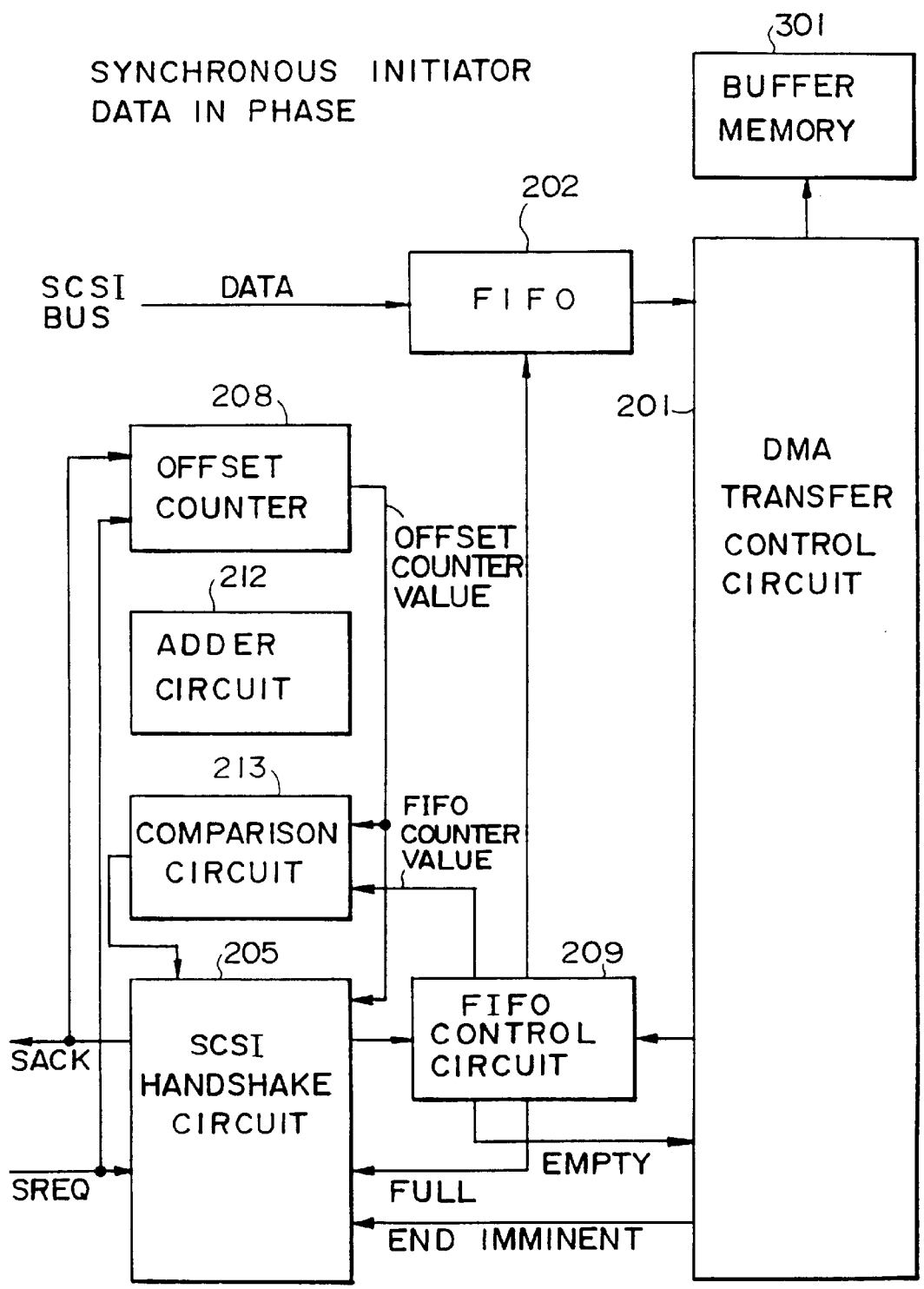
FIG. 18 shows signal flows during synchronous initiator data in phase.
Figure 19:
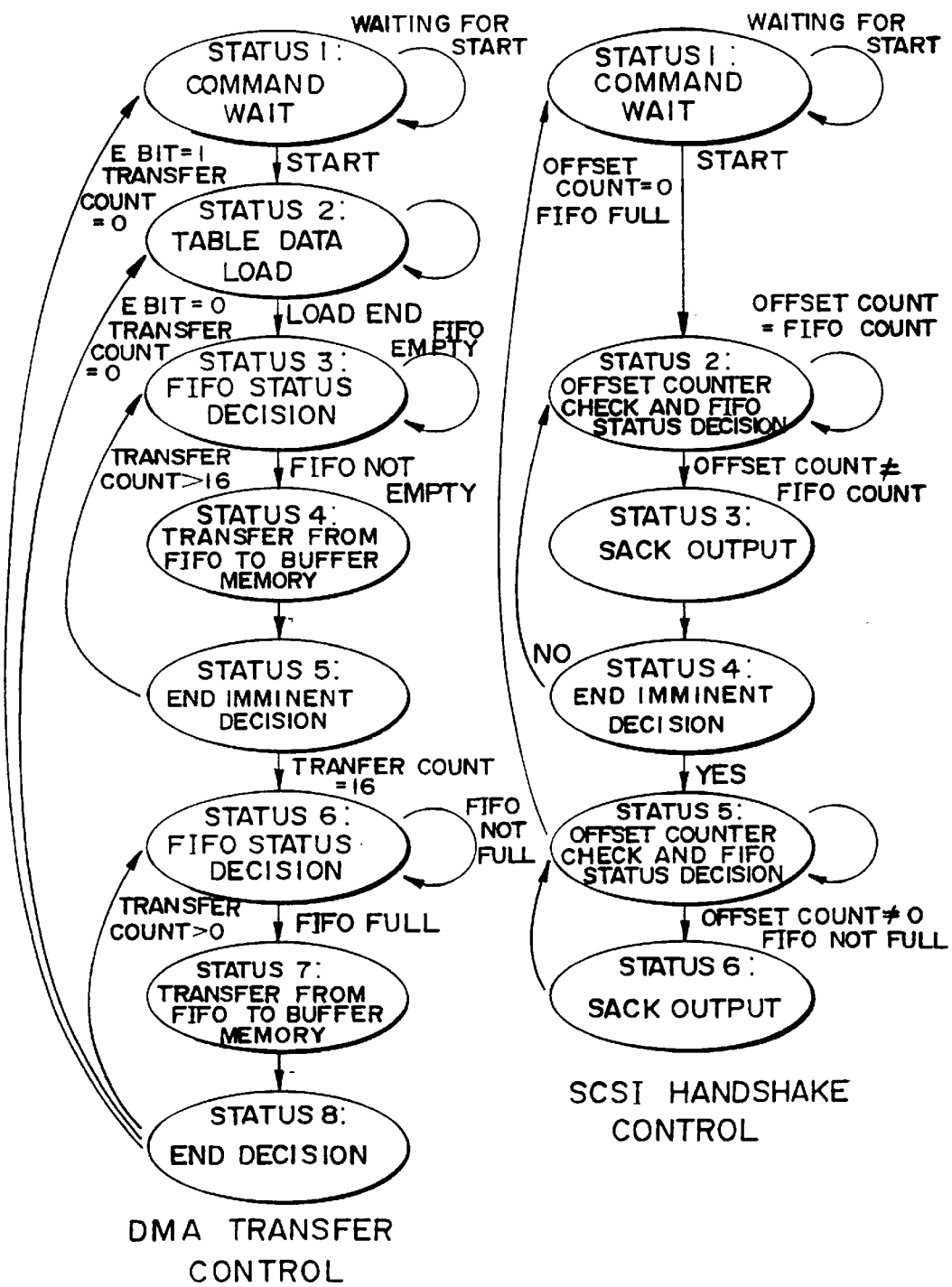
FIG. 19 shows status transitions during synchronous initiator data in phase.

In this case, data is input from the SCSI bus to this LSI, as shown in FIG. 18. Status transition diagrams are shown in FIG. 19. Both the DMA transfer control circuit and SCSI handshake circuit are activated by a transfer start command from the CPU.

6-1. DMA-Side Status Transitions

The DMA status transitions are the same as those described in Section 2 (refer to and compare FIG. 13 and FIG. 19), and thus description thereof is omitted.

6-2. SCSI-Side Status Transitions

Status 1: Wait for start command. If a start command arrives, the SCSI handshake circuit proceeds to status 2.

Status 2: Offset counter check and FIFO status decision. If the offset counter value is not equal to the FIFO counter value (the number of data items in the FIFO), the SCSI handshake circuit proceeds to status 3. Otherwise, it remains at status 2. In this case, the offset counter value and the FIFO counter value are compared by the comparison circuit 213 shown in FIG. 18.

Status 3: SACK pulse output. Since the data has already been fetched into the FIFO in synchronism with the SREQ pulses of the external devise, at this point only SACK is output. This decrements the offset counter by 1. The control provided by the above status 2 and status 3 ensures that the offset counter value (=SREQ−SACK) always becomes equal to the FIFO counter value. In other words, the configuration is such that, once data from the target on the SCSI bus is received, a SACK signal is not returend immediately. The data in the FIFO is transferred to the buffer memory, and the number of data in the FIFO is thereby reduced. The SACK signal is returned when this number becomes equal to the offset counter value. This control enables the SCSI handshake circuit and the DMA transfer control circuit to achieve synchronization.

Status 4: End imminent decision. If an end imminent signal arrives, the SCSI handshake circuit preoceeds to status 5. Otherwise, it returns to status 2.

Status 5: Offset counter check and FIFO status decision. If the offset counter value is not 0 and the FIFO is not full, the SCSI handshake circuit proceeds to status 6. If the FIFO is full when the offset counter is 0, the SCSI handshake circuit returns to status 1. Otherwise, it remains at status 5.

Status 6: SACK pulse output. This decrements the offset counter value by 1, and status 5 and status 6 are repeated until the offset counter value reaches 0.

Using the end imminent signal as described above can prevent the input of excessive data to the FIFO. In this case, since the configuration ensures that excessive data is not input, it is unnecessary for the SCSI handshake circuit and the DMA transfer control circuit to achieve synchronization, but this is actually ensured by the control of the above status 2 and 3.

7. Synchronous Target Data Out Phase

Figure 20:
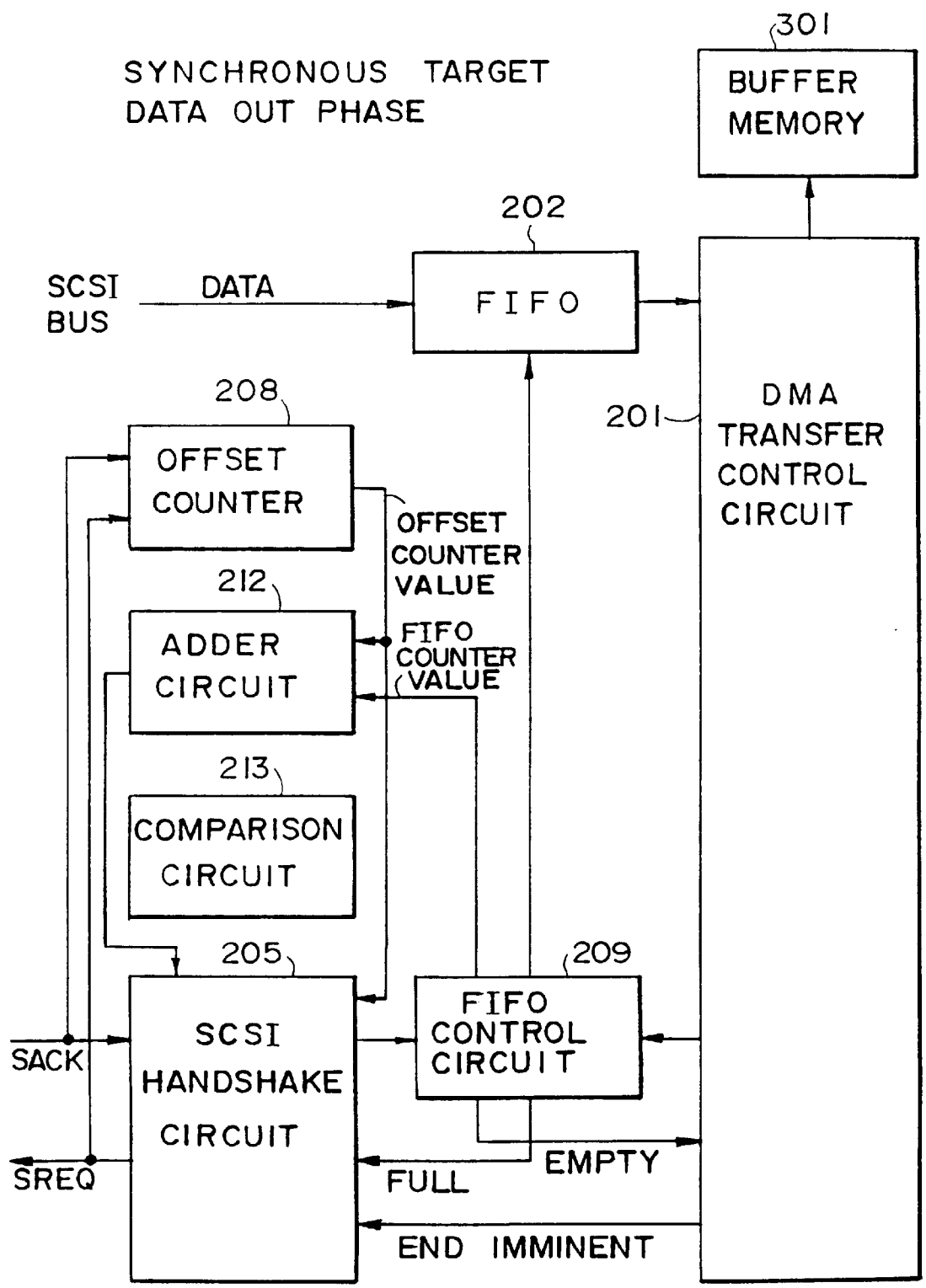
FIG. 20 shows signal flows during synchronous target data out phase.
Figure 21:
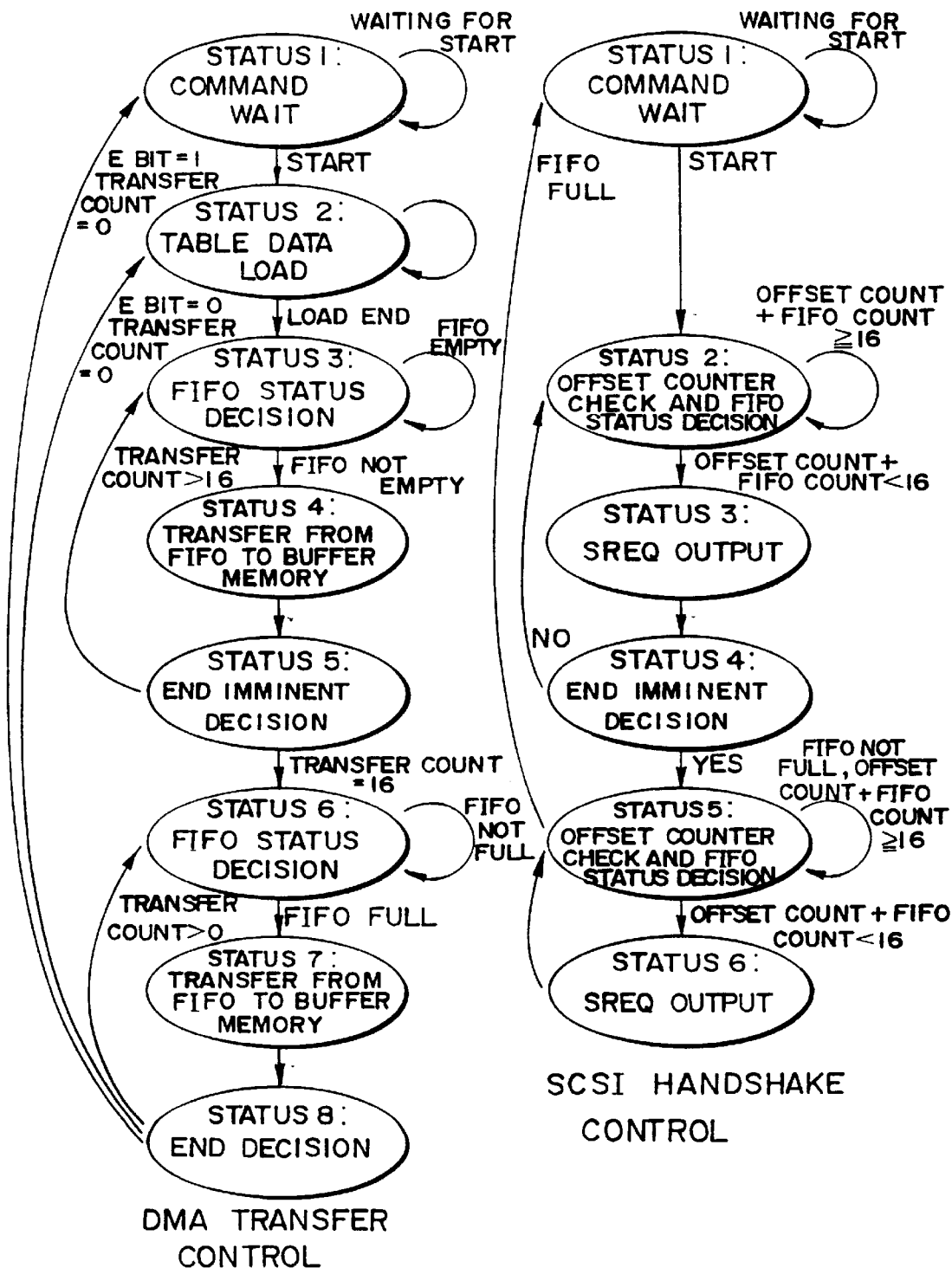
FIG. 21 shows status transitions during synchronous target data out phase.

In this case, data is input from the SCSI bus to this LSI, as shown in FIG. 20. Status transition diagrams are shown in FIG. 21. Both the DMA transfer control circuit and SCSI handshake circuit are activated by a transfer start command from the CPU.

7-1. DMA-Side Status Transitions

The DMA status transitions are the same as those described in Section 2 (refer to and compare FIG. 13 and FIG. 21), and thus description thereof is omitted.

7-2. SCSI-Side Status Transitions

Status 1: Wait for start command. If a start command arrives, the SCSI handshake circuit proceeds to status 2.

Status 2: Offset counter check and FIFO status decision. If the sum of the offset counter value and FIFO counter value does not exceed 16, the SCSI handshake circuit proceeds to status 3. Otherwise, it remains at status 2. The reason for this control is as follows. The offset counter value is the number of SACK pulses subtracted from the number of SREQ pulses that are output, so it refers to a number of data items equal to the offset counter value has already arrived from the initiator on the SCSI bus. On the other hand, the FIFO counter value refers to the number of data items that are currently in the FIFO. Therefore, it is necessary to control the output of SREQ to ensure that the sum of the number of data items that are expected to arrive in the future (the offset counter value) and the number of data items in the FIFO (the FIFO counter value) does not exceed 16, which is the FIFO storage capacity. In this case the the values in the offset counter and FIFO counter are added by the adder circuit 212 shown in FIG. 20.

Status 3: SREQ pulse output. Since the data is already fetched into the FIFO in synchronism with the SACK pulses of the external device, at this point only SREQ is output. This increments the offset counter by 1.

Status 4: End imminent decision. If an end imminent signal arrives, the SCSI handshake circuit proceeds to status 5. Otherwise, it returns to status 2.

Status 5: Offset counter check and FIFO status decision. If the FIFO has become full, the SCSI handshake circuit proceeds to status 1. If it is not full and the sum of the values in the offset counter and FIFO counter does not exceed 16, the SCSI handshake circuit proceeds to status 6. Otherwise it remains at status 5.

Status 6: SREQ pulse output. This increments the offset counter by 1, then the SCSI handshake circuit returns to status 5.

8. Synchronous Target Data In Phase

Figure 22:
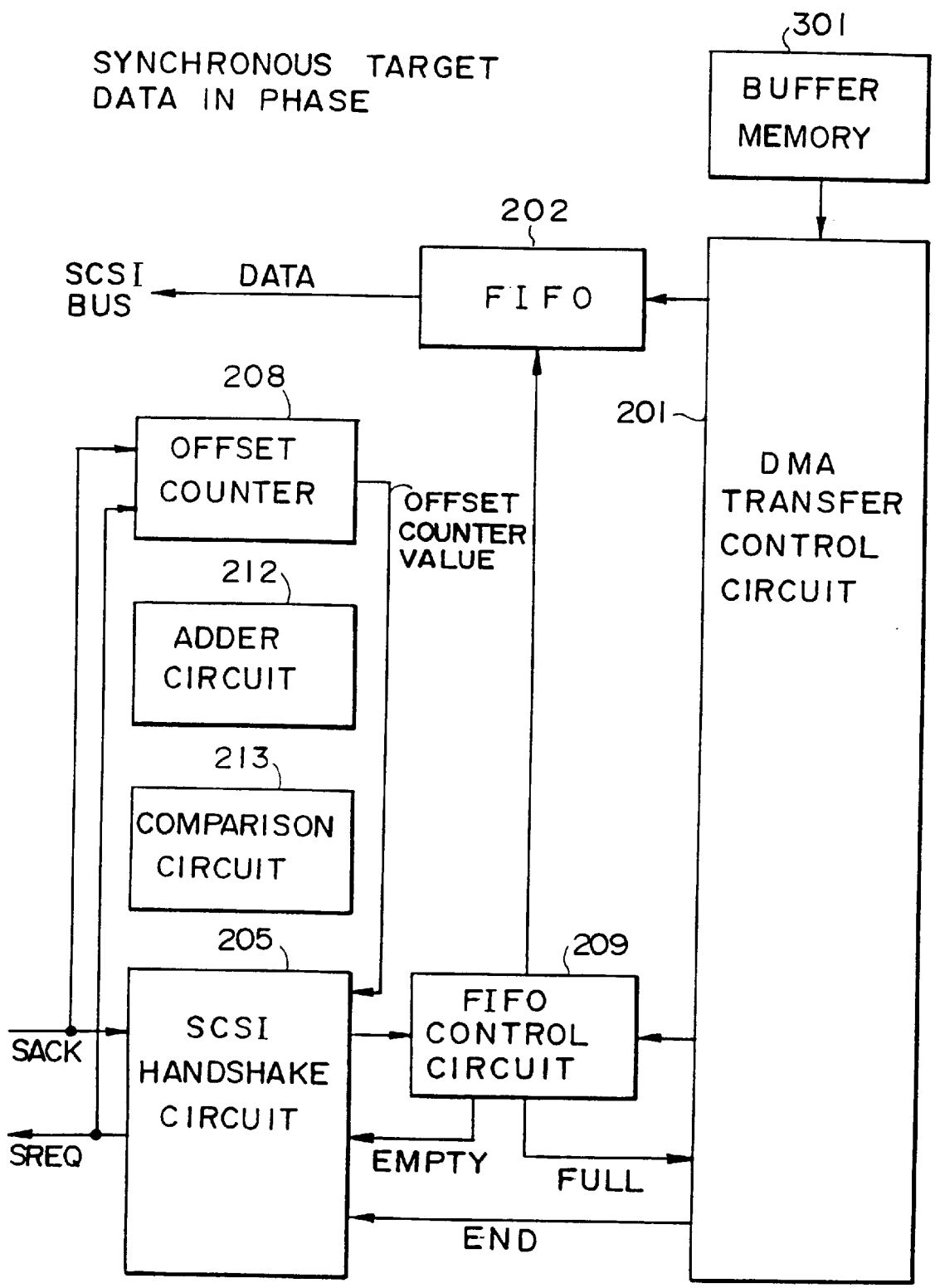
FIG. 22 shows signal flows during synchronous target data in phase.
Figure 23:
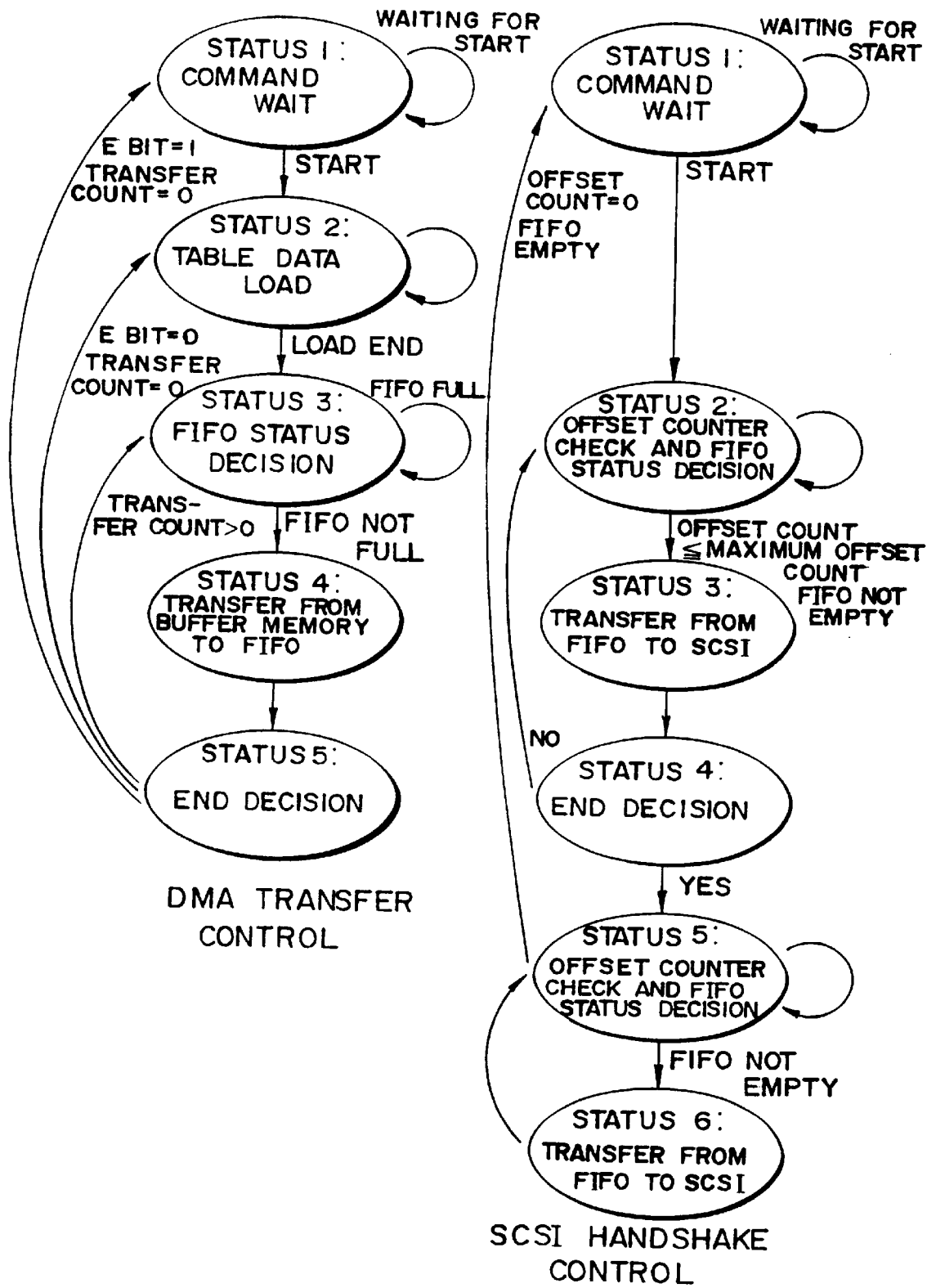
FIG. 23 shows status transitions during synchronous target data in phase.
Figure 24:
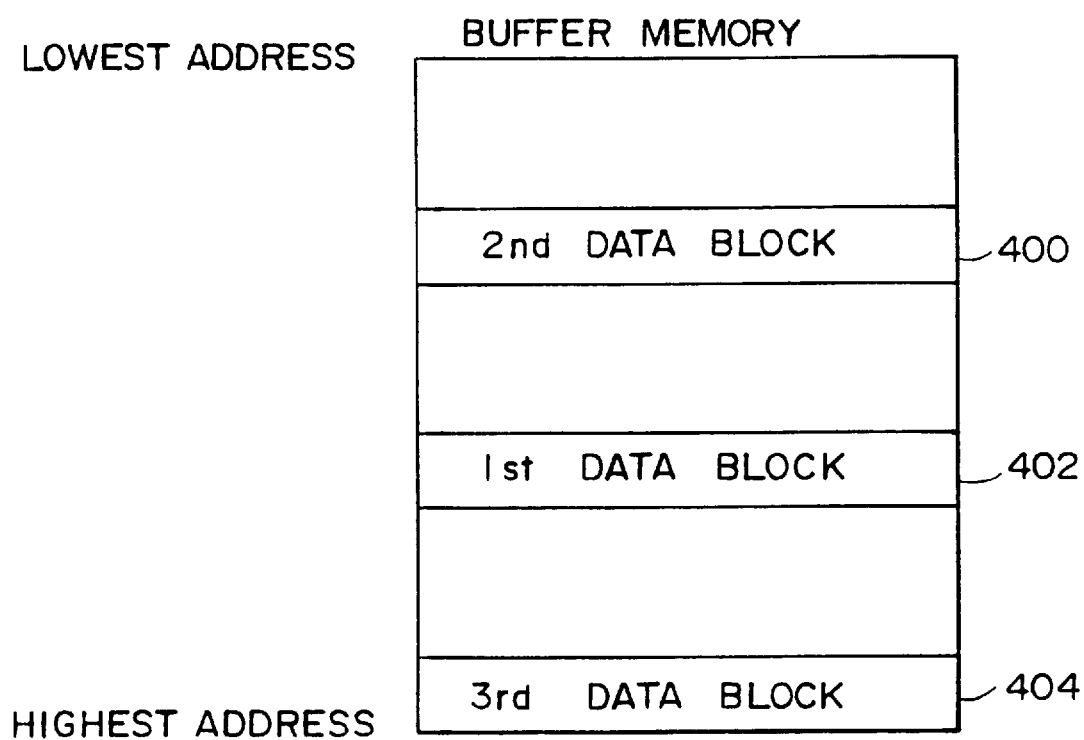
FIG. 24 is a diagram used for illustrating the problem of data blocks that are not arranged in sequence.

In this case, data is output from this LSI to the SCSI bus, as shown in FIG. 22. Status transition diagrams are shown in FIG. 23. Both the DMA transfer control circuit and SCSI handshake circuit are activated by a transfer start command from the CPU.

8-1. DMA-Side Status Transitions

The DMA status transitions are the same as those described in Section 1 (refer to and compare FIG. 11 and FIG. 23), and thus description thereof is omitted.

8-2. SCSI-Side Status Transitions

Status 1: Wait for start command. If a start command arrives, the SCSI handshake circuit proceeds to status 2.

Status 2: Offset counter check and FIFO status decision. If the FIFO is not empty and the offset counter value is less than the maximum offset counter value, the SCSI handshake circuit proceeds to status 3. Otherwise it remains at status 2. In other words, from the SCSI viewpoint, the target has to output SREQ in such a manner that the offset counter value (=SREQ−SACK) does not become less than the previously determined maximum offset counter value. Therefore, a decision concerning this status is necessary.

Status 3: Data transfer from FIFO to SCSI. The SCSI handshake circuit outputs FIFO data to the SCSI bus at the same time as the output of SREQ pulses.

Status 4: End decision. If an end signal arrives, the SCSI handshake circuit proceeds to status 5. Otherwise, it returns to status 2.

Status 5: Offset counter check and FIFO status decision. If the FIFO is empty and the offset counter value is 0, the SCSI handshake circuit returns to status 1. If the FIFO is not empty, it proceeds to status 6. Otherwise, it remains at status 5.

Status 6: Data transfer from FIFO to SCSI. The SCSI handshake circuit outputs FIFO data to the SCSI bus at the same time as the output of SREQ pulses, then returns to status 5.

9. Conclusion

The operations in the various modes described above will be summarized below.

A. The processing on the DMA transfer control circuit side is as follows, regardless of whether the transfer on the SCSI handshake circuit side is synchronous or asynchronous.

When data is transferred from the buffer memory to the FIFO, data is transferred so long as the FIFO does not become full, and the operation ends when the transfer count counter value reaches 0. When data is transferred from the FIFO to the buffer memory, data is transferred so long as the FIFO does not become empty, an end imminent signal is generated at the point at which the transfer count counter value becomes equal to the FIFO storage capacity, and transfer halts temporarily. The transfer restarts at the point at which the FIFO becomes full, then the operation ends at the point at which the transfer count counter value becomes 0.

B. The processing on the SCSI handshake circuit side is as follows, with the description divided into the various modes:

The basic operation when transferring data from the FIFO to the SCSI bus is the output of data while the FIFO is not empty. If an end signal arrives, the operation ends at the point at which the FIFO becomes empty.

The basic operation when transferring data from the SCSI bus to the FIFO is the input of data while the FIFO is not full. If an end imminent signal arrives, data is input until the FIFO is full, and the operation ends at the point at which it does become full.

Note that the present invention is not limited to the above described embodiments, and various configurations can be implemented within the range laid out by the claims of the present invention.

For example, the description of the embodiments concerned a plain SCSI interface as the first external interface, but the present invention is not limited thereto and it can be applied equally well to various different interfaces such as SCSI2 and SCSI3 interfaces.

Similarly, the units of the transfer count are not limited to segments and sectors, and various other units could be considered, such as clusters.

The present invention does not limit the number of interfaces that can transfer data via the buffer memory to two but can provide three or more such interfaces.

Further, the table data does not need to be stored in the buffer memory; the configuration could be such that this data is stored in the data transfer control device. The table data itself is not limited to the items and format described with respect to the above embodiment, so long as it achieves the same functions in practice as the table data described herein.

What is claimed is:

1. A data transfer control device for controlling data transfer via a buffer memory between first and second external interfaces of a plurality of external interfaces, wherein:

said data transfer control device comprises interface control means for controlling said first external interface which is an interface that transfers data by using an acknowledge signal and a request signal; FIFO storage means interposed between said first external interface and said buffer memory for temporarily storing transfer data; FIFO control means having at least means for setting an empty signal true, when the empty capacity of said FIFO storage means is equal to the storage capacity of said FIFO storage means, and setting a full signal true when said FIFO storage means has no empty space; and data transfer control means for providing control for data transfer between said FIFO storage means and said second external interface, via said buffer memory;

said data transfer control means comprises means for transferring data from said buffer memory to said FIFO storage means when said full signal is false; transfer count counting means for obtaining the transfer count of data transferred from said buffer memory to said FIFO storage means; and means for setting an end signal true when said transfer count reaches zero; and said interface control means comprises means for transferring data from said FIFO storage means to said first external interface when said empty signal is false, and means for ending said data transfer from said FIFO storage means to said first external interface, when both said end signal and said empty signal are true.

2. A data transfer control device according to claim 1, wherein:

said data transfer control device further comprises offset calculation means for calculating the difference between the number of times said request signal is generated and the number of times said acknowledge signal is generated, as an offset counter value, and means for determining the timing at which said request signal or acknowledge signal is generated, on the basis of said offset counter value.

3. An information processing system characterized in comprising a data transfer control device according to claim 1, external devices connected to said first and second external interfaces, a buffer memory, and an external control means.

4. A data transfer control device for controlling data transfer via a buffer memory between first and second external interfaces of a plurality of external interfaces, wherein:

said data transfer control device comprises interface control means for controlling said first external interface which is an interface that transfers data by using an acknowledge signal and a request signal; FIFO storage means interposed between said first external interface and said buffer memory for temporarily storing transfer data; FIFO control means having at least means for setting an empty signal true, when the empty capacity of said FIFO storage means is equal to the storage capacity of said FIFO storage means, and setting a full signal true when said FIFO storage means has no empty space; and data transfer control means for providing control for data transfer between said FIFO storage means and said second external interface, via said buffer memory;

said data transfer control means comprises means for transferring data from said FIFO storage means to said buffer memory when said empty signal is false; transfer count counting means for obtaining the transfer count of data transferred from said FIFO storage means to said buffer memory; and means for setting an end imminent signal true and also temporarily halting the data transfer when said transfer count becomes equal to the storage capacity of said FIFO storage means, restarting said data transfer at a stage at which said full signal becomes true, and ending said data transfer when the data count to be transferred becomes zero; and said interface control means comprises means for transferring data from said first external interface to said FIFO storage means when said full signal is false; and means for performing data transfer from said first external interface to said FIFO storage means until said full signal becomes true when said end imminent signal is true, and ending data transfer when said full signal becomes true.

5. A data transfer control device according to claim 4, wherein:

said data transfer control device further comprises offset calculation means for calculating the difference between the number of times said request signal is generated and the number of times said acknowledge signal is generated, as an offset counter value; means for adding said offset counter value to the number of data items in said FIFO storage means; means for comparing said offset counter value and the number of data items in said FIFO storage means; and means for determining the timing at which said request signal or acknowledge signal is generated, on the basis of said offset counter value, an addition result obtained by said adder means, and a comparison result obtained by said comparison means.

6. An information processing system characterized in comprising a data transfer control device according to claim 4, external devices connected to said first and second external interfaces, a buffer memory, and an external control means.

* * * * *